United States Patent
Dever et al.

(10) Patent No.: US 7,278,223 B1
(45) Date of Patent: Oct. 9, 2007

(54) HOUSING ACTIVATED INTELLIGENT MARKING SYSTEM FOR HAND-HELD SENSING AND MEASURING DEVICES

(75) Inventors: Kathleen M. Dever, Stowe, VT (US); Michael D. Potter, Churchville, NY (US)

(73) Assignee: Anza Corporation, Stowe, VT (US)

( * ) Notice: Subject to any disclaimer, the term of this patent is extended or adjusted under 35 U.S.C. 154(b) by 0 days.

(21) Appl. No.: 11/344,985

(22) Filed: Feb. 1, 2006

Related U.S. Application Data

(60) Provisional application No. 60/649,346, filed on Feb. 2, 2005, provisional application No. 60/654,728, filed on Feb. 18, 2005.

(51) Int. Cl.
*B25H 7/04* (2006.01)

(52) U.S. Cl. .......................................... 33/666; 33/574

(58) Field of Classification Search .................. 33/574, 33/577, 666–679
See application file for complete search history.

(56) References Cited

U.S. PATENT DOCUMENTS

| | | | |
|---|---|---|---|
| 4,551,921 A | 11/1985 | Puyo et al. | |
| 5,416,978 A * | 5/1995 | Kaufman | 33/668 |
| 5,829,147 A * | 11/1998 | Kousek et al. | 33/666 |
| 5,829,152 A | 11/1998 | Potter et al. | |
| 6,178,655 B1 | 1/2001 | Potter et al. | |
| 6,211,662 B1 | 4/2001 | Bijawat et al. | |
| 6,952,880 B2 | 10/2005 | Saksa | |
| 2001/0007420 A1 | 7/2001 | Bijawat et al. | |
| 2004/0107850 A1 | 6/2004 | Hughes | |
| 2004/0255477 A1 | 12/2004 | Levine et al. | |
| 2005/0200368 A1 * | 9/2005 | Krantz | 324/661 |

* cited by examiner

*Primary Examiner*—G. Bradley Bennett
(74) *Attorney, Agent, or Firm*—Thomas G. Ference

(57) ABSTRACT

The present invention is directed to an integrated assembly for gathering information and transferring it to a surface. The assembly comprises a housing, a base resiliently connected to the housing, one or more sensors mounted to sense a parameter and a marker positioned so a mark is produced on the surface when the housing is pressed toward the surface. The marker is capable of marking a plurality of different types of marks. Each type of mark provides different information derived from the sensor. A selector is capable of selecting among the plurality of different type of marks to provide a unique mark specific to a type of information detected.

54 Claims, 17 Drawing Sheets

HOUSING ACTIVATED INTELLIGENT MARKING SYSTEM FOR HAND-HELD SENSING AND MEASURING DEVICES

RELATED APPLICATIONS

This application claims the benefit of priority of U.S. Provisional Patent Applications No. 60/649,346, filed Feb. 2, 2005 entitled "Surface Marker for Sensor" and No. 60/654,728, filed Feb. 18, 2005 entitled "Sensor and Marking Device Therefore", both herein incorporated by reference.

FIELD OF THE INVENTION

This invention relates to a marking system for hand-held information gathering devices that sense or measure a material or physical property near or within an object. More specifically, it relates to a marking system that is housing activated and leaves an intelligent mark on the surface of the object thereby recording information related to the material or physical property measured.

BACKGROUND OF THE INVENTION

Numerous information gathering devices have been invented to sense or measure a material or physical property near or within a object. These devices are usually hand-held and are commonly used to aid individuals working in the construction and home improvement industries. Some examples include nail detectors, stud finders, levels, protractors and tape measurers. These devices have evolved from simple mechanical devices using a magnet, spirit level or linear scale to more sophisticated devices utilizing a multitude of electronic sensors, impulse radar and even laser light. Hand-held devices now exist that can perform multiple functions incorporating a stud finder, level and laser ruler all in one.

When using these devices it is usually necessary to record the information gathered from the device onto the surface on which the measurement took place. The process of the transference of information from the information gathering device, which may include a sensor, range finder using laser means, sonic means, or other means of generating information, to the surface of the object by making a mark on the object can be time consuming and can be subject to inaccuracies. This process of transference of information becomes even more of a challenge when different types of information from different sensors located within the same information gathering device need to be transferred to the surface.

The current methods of marking for these information gathering devices fall into a few categories. The first and oldest is taking a pen or pencil and marking by hand. This allows for an unlimited variety of information to be transposed, however, accurately locating the information can be a problematic. For instance in the case of a level, trying to hold a long level with one hand and drawing a smooth line along the edge with your free hand usually ends with the level moving and the individual drawing a curved line defeating the purpose of marking a level line. Improvements to this marking technique have been made by securing the level with added frictional surfaces or clamps. While these improvements can increase the accuracy by better holding the level in place, the added act of clamping the level adds a new level of complexity to the transference of information to the object surface. In yet another case where the information gathering device includes a sensor, the sensor is usually located on the base of the device. In order to mark a measured location, the user may need to pick up and move the device in order to place a mark where the sensor measured it. This obviously leads to inaccuracies in placement of the mark.

In an attempt to improve upon the free hand approach to information transference, information gathering devices have added marking slots. These slots or holes in the device housing allow the user to guide the pen or pencil to a specific point. This can reduce inaccuracies by more accurately guiding the writing instrument to a measured point. A marking slot in the housing can also allow the user to make marks under or within the perimeter of the information gathering device housing, eliminating the need to remove the device from the measured surface to make a mark. This approach of guiding the writing instrument to a marking slot helps improve accuracy and can allow for marking within the perimeter of the information gathering device, but it still requires the use of both hands.

A second category of marking information involves the use of a marker attached to the information gathering device. This type of marking system usually takes the form of a pen or sharp pointed pin that is attached to the information gathering device. This pen or sharp pointed pin marker is activated from the top of the device. To mark, the user must lift a finger from the device housing and reposition it on the marking activation button to depress or pull on the marker. One must push down or pull on the button, which acts to move the pin until it protrudes from the bottom of the device. It is awkward and difficult to hold the information gathering device steady while moving the finger to activate the button. Not all users of such devices have large hands and wide/finger spread to not only reach the button but then activate it. The resulting point mark transferred to the surface may be so small that the user cannot find it once they have marked a location and moved away from that surface to obtain another tool such as a drill or hammer, and revisit the same wall. This button activated pen/pin approach also does not work well on certain information gathering devices such as a level where marking a line is what is really important.

Except for the case of the user explicitly writing on the surface with a marker, none of the approaches to marking described above actually transfer intelligent or multiple types of information to the surface. The trend in hand-held information gathering devices is to provide more sophistication with multiple types of information measured. For instance, hidden object sensors now are able to sense wood, metal and live wires behind a wall. With such devices that may use multiple sensors to detect multiple materials, there is a need to be able to intelligently mark the sensed information about each material on the wall, not make just a simple point mark. Integrated devices that include a stud finder, laser or sonic measurer and level all part of the same information gathering device would benefit from a marking system that could indicate information about any one of the sensed or measured parameters that this device is capable of detecting. Digital read outs are now being incorporated on levels, tape measurers, etc. The ability to transfer such alphanumeric information to a surface would be of great value.

While existing inventions provide for simple marks from information gathering devices, the process of making these measurements and marking the object is still awkward, inefficient and subject to inaccuracies. In general, no method or apparatus has been developed to provide intelligent marking from multiple sensors.

SUMMARY OF THE INVENTION

One aspect of the present invention is directed to a device for marking a surface comprising a housing, a base resiliently connected to the housing, a sensor mounted to sense a parameter and a marker positioned so a mark is produced on the surface when the housing is pressed toward the surface.

Another aspect of the present invention is directed to a device for marking a surface wherein the marker is capable of marking a plurality of different types of marks. Each type of mark provides different information derived from the sensor and a selector is capable of selecting among the plurality of different type of marks to provide a unique mark specific to a type of information detected.

Still another aspect of the present invention is directed to a device for marking a surface comprising a first housing and a second housing. The first housing includes a sensor and the second housing includes a marker and a resiliently connected base. The first housing is connected to the second housing and when the second housing is moved toward the surface it produces a mark on the surface.

Yet another aspect of the present invention is directed to a method of marking a surface comprising placing a housing including a marker and a sensor, and a base resiliently connected to the housing on the surface, then using the sensor to sense a parameter and marking the surface by pressing the housing toward the surface. Information about the parameter sensed is marked on the surface.

BRIEF DESCRIPTION OF DRAWINGS

The foregoing and other aspects and advantages of the invention will be apparent from the following detailed description of the invention, as illustrated in the accompanying drawings, in which:

FIG. 4b is a bottom plan view of the hidden object sensor in FIG. 4a;

FIG. 4c is a cross-sectional, side elevation, schematic diagram of the hidden object sensor in FIG. 4a;

FIG. 6a is a top plan view of a hidden object sensor that allows for automatic electronically selected housing activated marking;

FIG. 6b is a block diagram depicting the system that allows for automatic electronically selected housing activated marking of the hidden objects sensor in FIG. 6a;

FIG. 6c is a cross-sectional side elevation, schematic diagram of the hidden object sensor in FIG. 6a;

FIG. 9d is a bottom plan view of the level in FIG. 9a;

FIG. 10b is a bottom plan view of the information gathering and marking device in FIG. 10a;

DETAILED DESCRIPTION OF THE INVENTION

In the following detailed description reference is made to the accompanying drawings, the drawings are not drawn to a uniform scale. In this regard, directional terminology, such as "top", "bottom", "front", "back", "leading", "trailing", etc. is used with reference to the orientation of the figure(s) being described. Since components of the present invention can be positioned in a number of different orientations, the directional terminology is used for purposes of illustration and is in no way limiting. It is also to be understood that other embodiments may be utilized and structural or logical changes may be made without departing from the scope of the present invention.

The terms "marking means" and "marker" or "sensor" and "sensing means" are used synonymously throughout this specification and the appended claims. However, none of the appended claims are intended to invoke paragraph six of 35 USC section 112 unless the exact words "means for" are followed by a participle in a particular claim.

The present invention is aimed at improving the efficiency, accuracy and ease of marking information from hand-held information gathering devices. It is also directed towards being able to access information generated by multiple sensing means within or attached to a information gathering device and have that information recorded by housing activation as an intelligent mark on the surface of the object measured.

U.S. Pat. No. 5,829,152 and U.S. Pat. No. 6,178,655 to Michael D. Potter and Kathleen M. Dever, applicants of the current invention, provide supplemental information for housing activated marking on a surface and are both herein incorporated by reference.

Figure 1A:
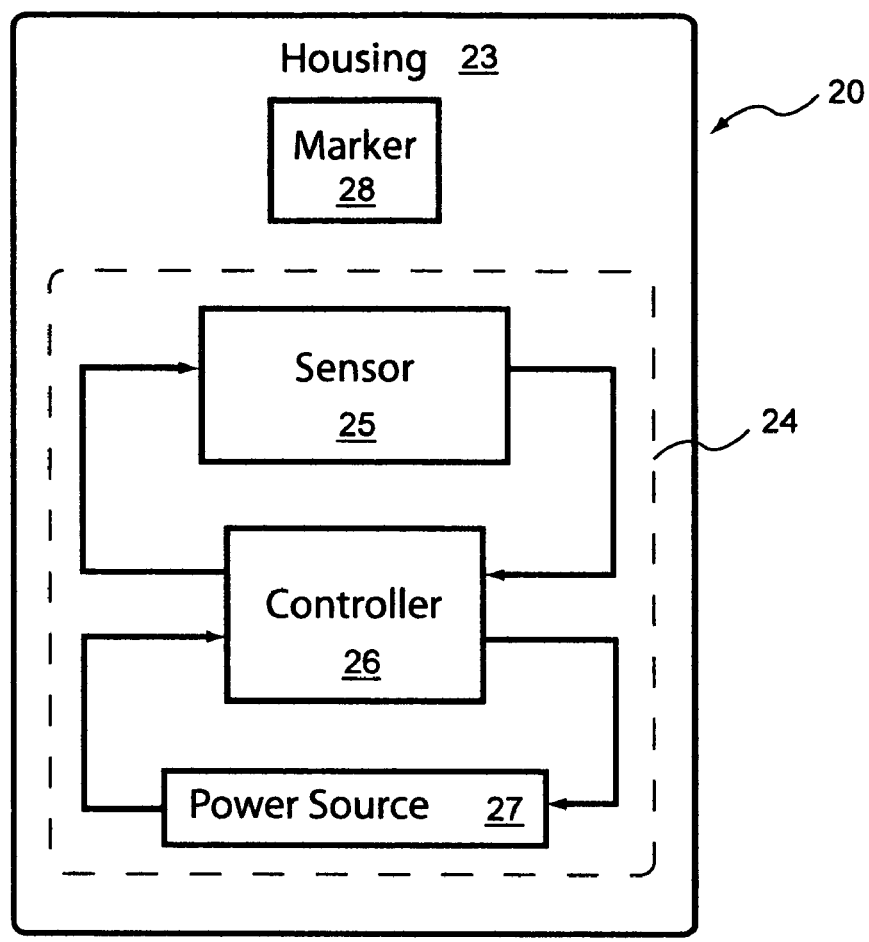
FIG. 1a is a block diagram depicting an information gathering device incorporating a housing activated marker with a sensor according to one embodiment of the present invention.
Figure 1B:
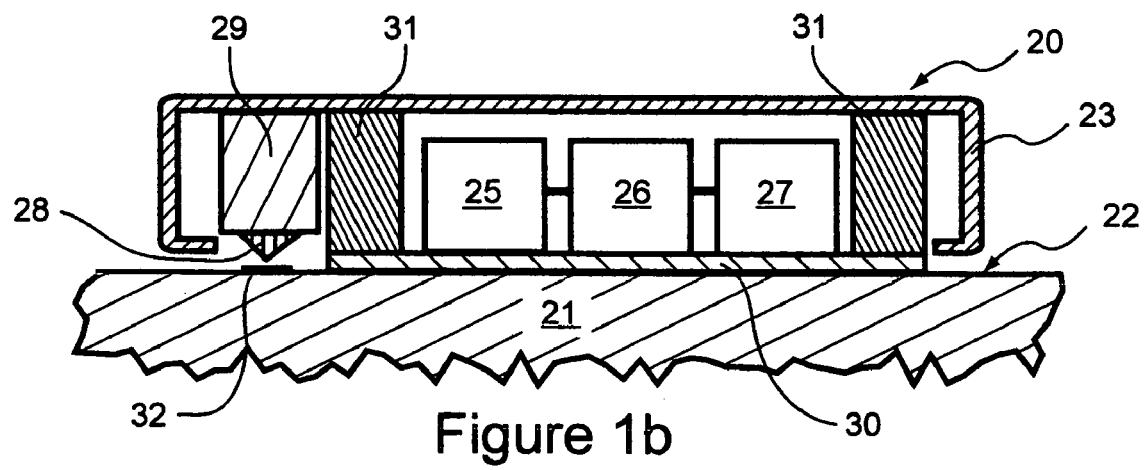
FIG. 1b is a cross-sectional, side elevation, schematic diagram of the information gathering device in FIG. 1a depicting the use of a resilient material to enable the housing activated marker.

FIGS. 1a and 1b illustrate one embodiment of an integrated assembly for gathering information and transferring it to a surface according to the present invention. Measurement and marking device 20 is an apparatus configured for measuring a material or physical property near or within an object 21. Object 21 includes, but is not limited to any material such as wood, plastic, steel concrete or other solid substance having at least one surface 22. Apparatus 20 comprises a housing 23, a base 30, a sensor 25 and a marker 28. Housing 23 may be made of plastic or any flexible, semi-rigid or rigid material Integrated with housing 23 is an information gathering device 24 that includes a sensor 25 and may further include a controller 26 and a power source 27. Sensor 25 is mounted to sense a physical or material property. Sensor 25 may be any sensing device including but not limited to a hidden-object sensor, position sensor, leak detector, a level sensor, a laser measurer, a sonic measurer, other types of range finders or a sensor for detecting a selected substance. Sensor 25 and controller 26 may be integrated into a single component such as a semiconductor chip or exist as separate components. Power source 27 may be a battery or connect to an external power supply.

A marking means 28 for marking surface 22 is supported by support 29 which is connected to housing 23. Housing 23 has a base 30 that is resiliently connected to the housing by a resilient connection means 31. Marking means 28 is maintained in a spaced-apart relationship from surface 22 until the user presses housing 23 relative to the surface in a predetermined direction towards the surface, whereupon marking means 28 extends outward beyond base 30 to mark surface 22 with a mark 32 at a desired point. The predetermined direction may be substantially perpendicular to surface 22 or at an angle relative to surface 22. Marker 28 may operate through an aperture in the bottom of either housing 23 or base 30.

Marking means 28 comprises a quantity of marking material that can be ink, pencil lead, graphite, chalk, dye, light-sensitive material, soapstone, crayon, wax, pigment, paint or mixtures, compounds or composites of these or other marking materials. If the marking material is an ink, it may be a pigment ink, an oleate-based ink, or ink suitable for inkjet printing. Alternatively, marking means 28 may be a rigid or sharp structure that can score or leave an impression in surface 22. Marking means 28 may also leave a mark 32 that is not visually observed, but that can be detected by other than the naked eye. For example, marker 28 may leave a magnetic (non visible) mark 32 that can be detected by a magnetic detector. Florescent dye or inks are other alternatives to the visually detected mark. Resilient connection means 31 may be chosen from any number of resilient materials or components, such as springs, rubber, foam, hinged connectors, etc.

Operation of measurement and marking apparatus 20 is such as to provide housing activated marking that is achievable by using only one hand. The marking is accomplished without requiring any additional finger movement or finger transference to another part of apparatus 20 in order to mark. Transference of mark 32 to surface 22 is a result of a simple push on the housing 23 in a direction substantially towards the intended marking surface. Marker 28 and sensor 25 are both aligned to housing 23. Housing 23 therefore acts as a reference point from which to measure and uniquely mark surface 22. As a result, sensor 25 is aligned with marker 28.

Figure 2A:
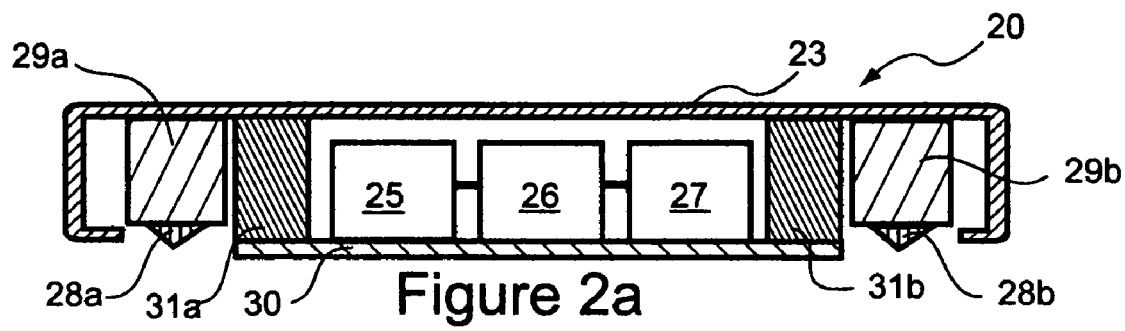
FIG. 2a is a cross-sectional, side elevation, schematic diagram showing an embodiment of the present invention that incorporates a resilient material to enable housing activation of two independent markers.
Figure 2B:
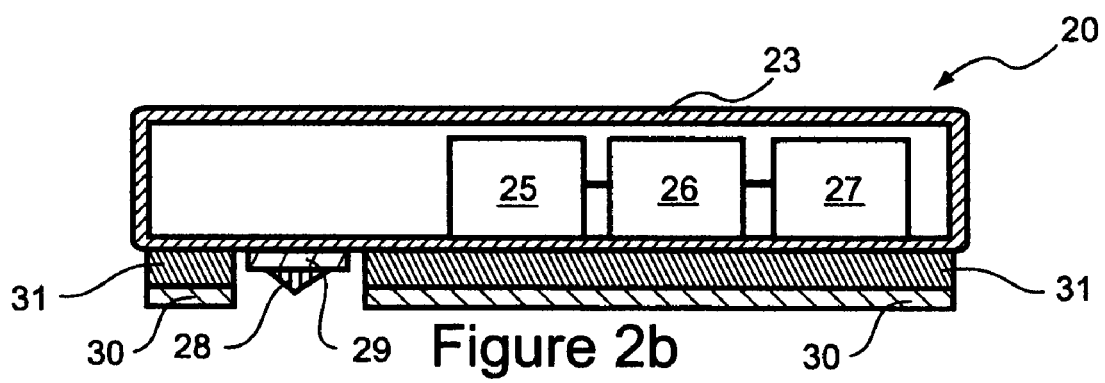
FIG. 2b is a cross-sectional, side elevation, schematic diagram showing another approach for incorporating a resilient material to enable a housing activated marker.
Figure 2C:
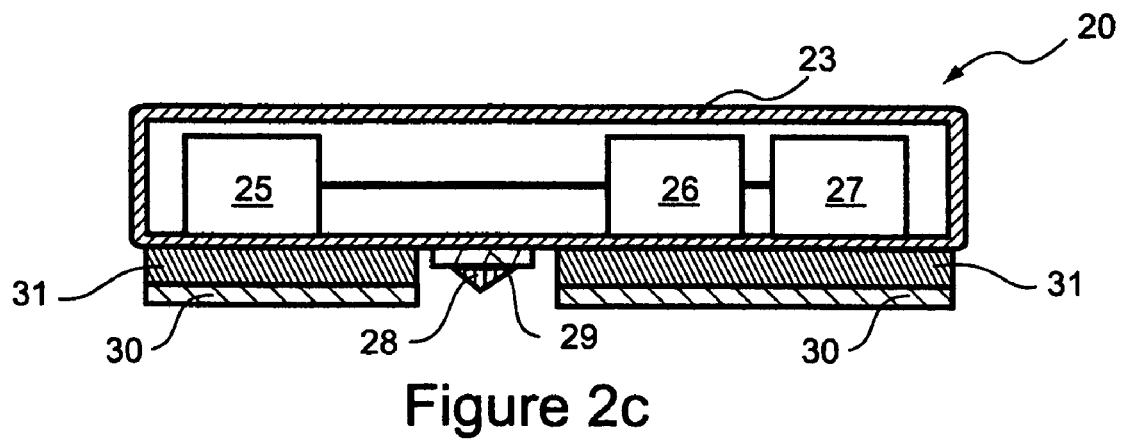
FIG. 2c is a cross-sectional, side elevation, schematic diagram showing an alternative way of locating the marker relative to the sensing system.
Figure 2D:
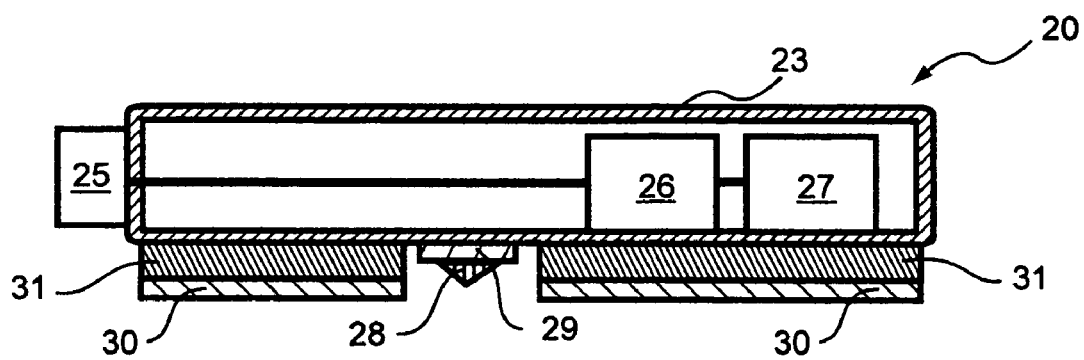
FIG. 2d is a cross-sectional, side elevation, schematic diagram showing the sensor may be located outside of the housing and other elements of the information gathering device contained within the housing.
Figure 2E:
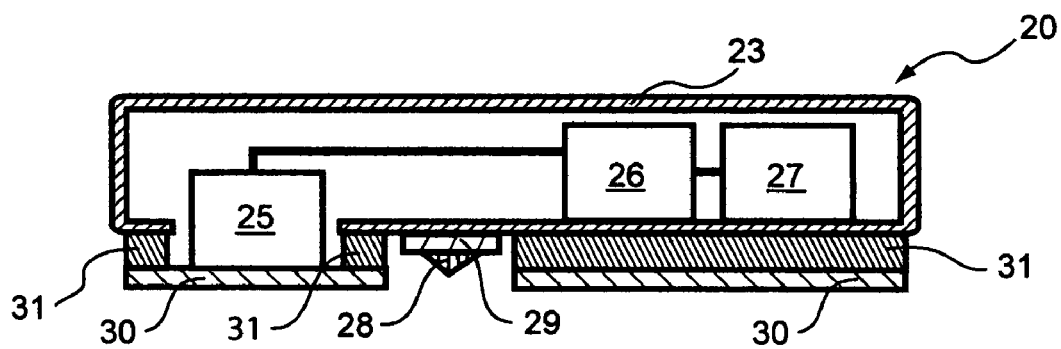
FIG. 2e is a cross-sectional, side elevation, schematic diagram showing the sensor located on the base of the information gathering device and other elements of the sensor system contained within the housing.
Figure 2F:
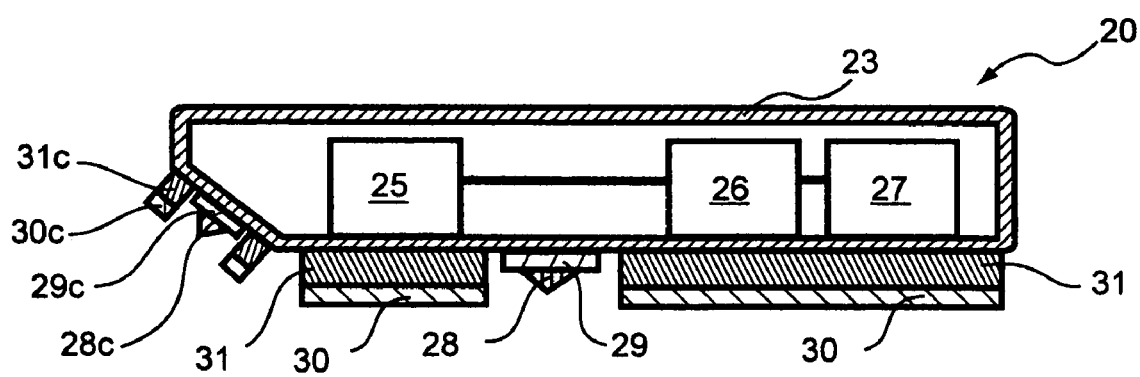
FIG. 2f is a cross-sectional, side elevation, schematic diagram showing a structure that allows housing activated marking by tilting the information gathering device relative to the marking surface.

FIGS. 2a-2f illustrate several embodiments showing how the position of components may be modified without departing from the scope of the present invention. FIG. 2a shows how two markers 28a and 28b can be attached to opposite ends of housing 23 through supports 29a and 29b. This configuration allows the user to selectively push down on one end of housing 23 with more force than the other end of the housing, thereby activating one marker 28a or 28b over the other. For example, if the user applies more pressure to the "a" side of housing 23, resilient connection means 31a will compress more than resilient connection means 31b and marker 28a will mark while marker 28b will not. FIG. 2b shows how resilient connection means 31 may be connected to the bottom of housing 23 instead of the top to produce a structure that is still housing activated. Here marker 28 resides within an aperture in base 30. FIG. 2c shows that the position of sensor 25 and marker 28 may be changed relative to each other. FIG. 2d shows that sensor 25 may be located outside of housing 23 and other elements of the information gathering device contained within the housing. In FIG. 2e, sensor 25 may be connected directly to base 30. Positioning sensor 25 in close proximity to base 30 can provide for more sensitive measurements relative to the surface being measured. Finally, FIG. 2f shows an optional configuration in which a marker 28c supported by 29c may be added to housing 23. By tilting or rotating housing 23, the user can compress resilient connection means 31c to activate marker 28c to extend beyond base 30c to mark. Obviously other modifications to the position of components may be made without departing from the scope of the present invention.

Figure 3A:
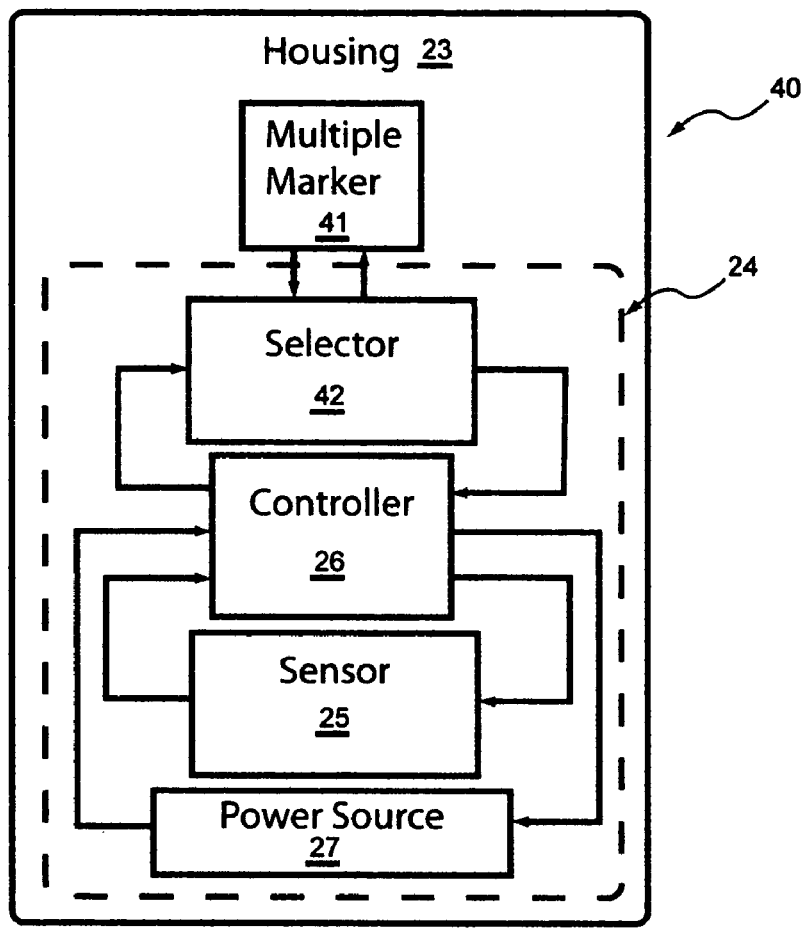
FIG. 3a is a block diagram depicting an information gathering device incorporating a housing activated multiple-marker and selector with a sensor according to another embodiment of the present invention.
Figure 3B:
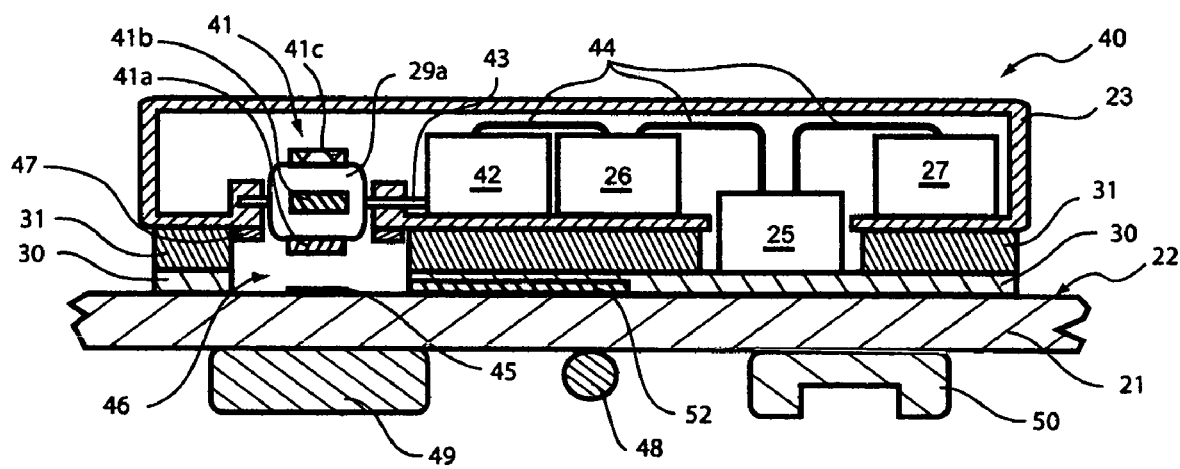
FIG. 3b is a cross-sectional, side elevation, schematic diagram of the information gathering device in FIG. 3a depicting the use of a resilient material to enable the housing activated marker.
Figure 4A:
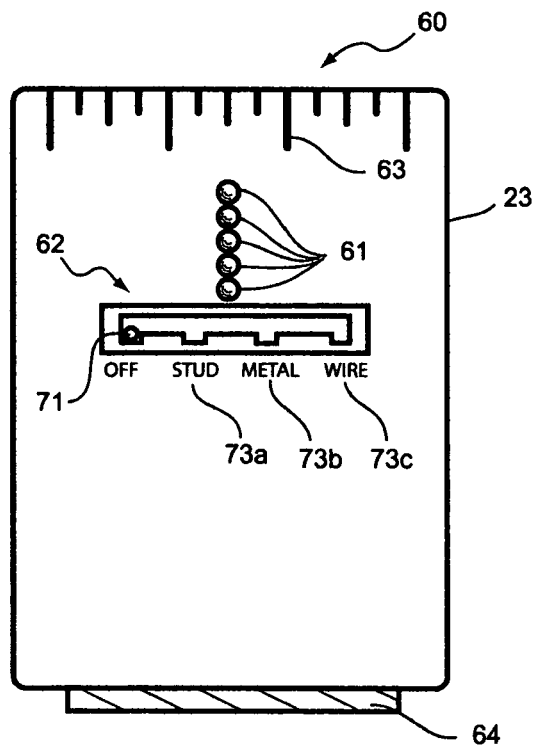
FIG. 4a is a top plan view of a hidden object sensor that allows for manually selectable housing activated marking.
Figure 4B:
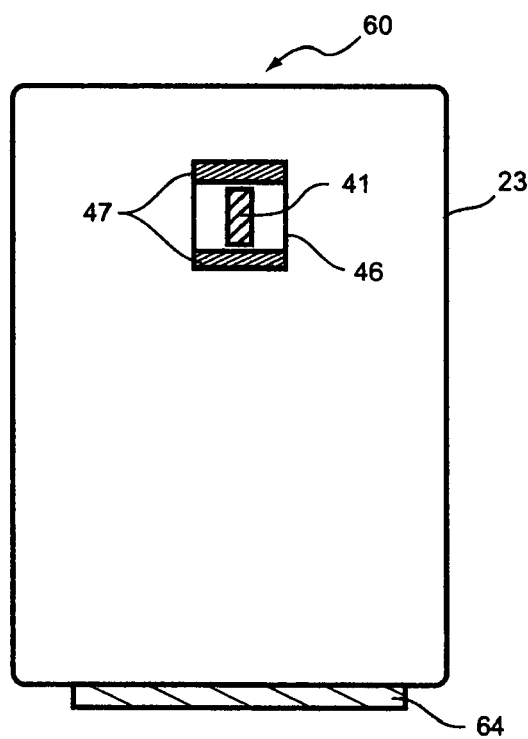
Figure 4C:
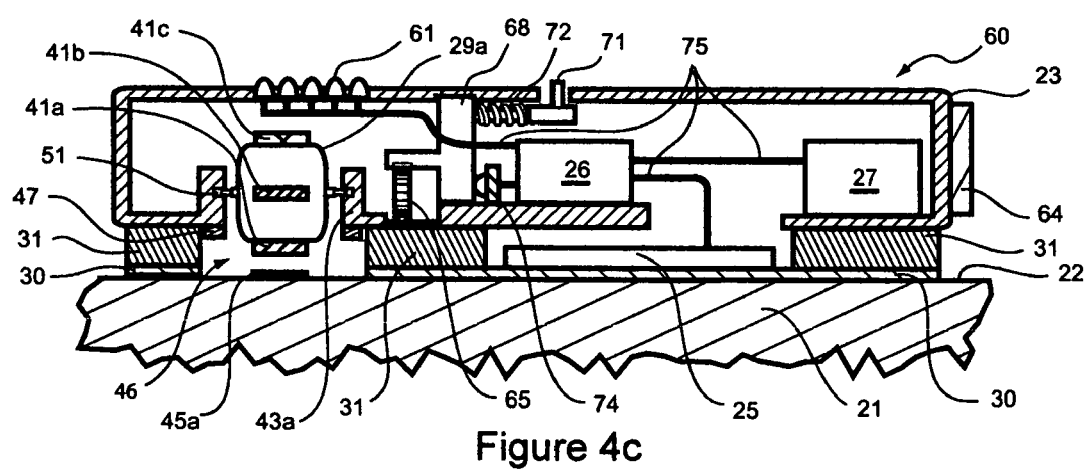
Figure 4D:
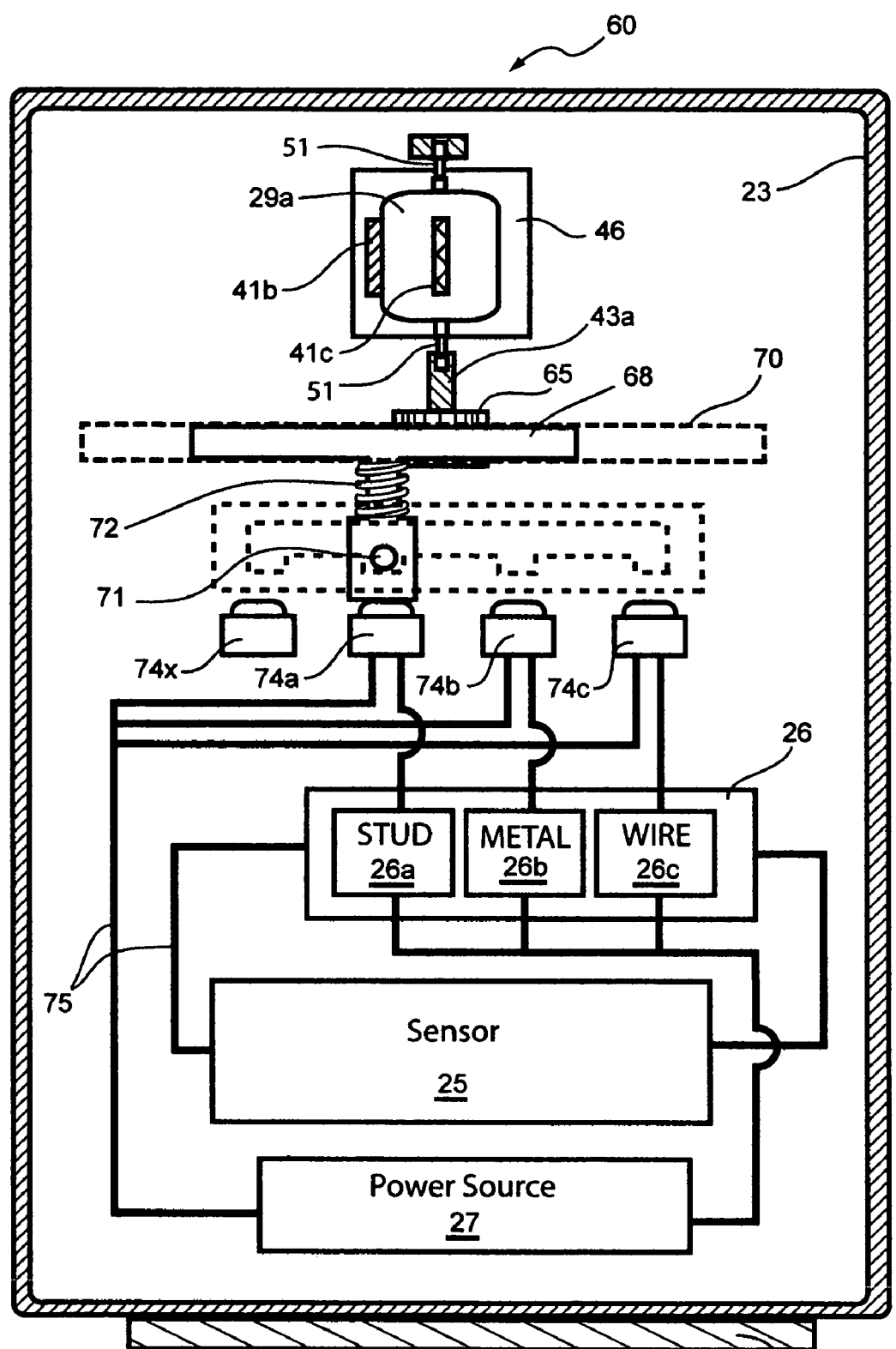
FIG. 4d is a cross-sectional top view, schematic diagram of a hidden object sensor depicted in FIGS. 4a-c that allows for manual selection of the type of information to be marked by the housing activated marking system.
Figure 4E:
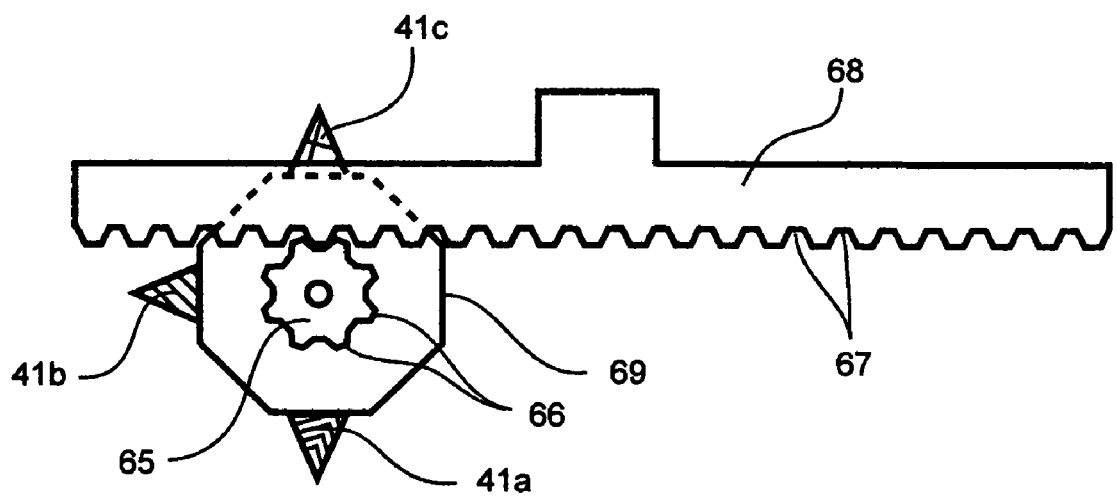
FIG. 4e is a cross-sectional side elevation, schematic diagram showing an embodiment of how the selector can engage the multiple-marker to select a marker.

FIGS. 3a and 3b illustrate another embodiment of an integrated assembly for gathering information and transferring it to a surface according to the present invention. In this embodiment, measurement and marking apparatus 40 is capable of sensing or measuring multiple materials or physical properties near or within an object 21. By integrating multiple marking means 41 and a selector 42 into marking apparatus 40, the user is able to intelligently mark unique information about each property measured. Apparatus 40 comprises a housing 23. At least partially contained within or connected to housing 23 is at least one information gathering device 24 comprising one or more sensors 25, a controller 26, a selector 42 and a power source 27. Sensor 25, controller 26 and selector 42 may be integrated into a single component such as a semiconductor chip or they may be individual components. As individual components they may communicate or drive each other through connections 44.

Multiple marker 41 has individual marking means 41a-c supported by support 29a which is connected to housing 23 by connector 43. Housing 23 has a base 30 that is resiliently connected to the housing by a resilient connection means 31. Individual marking means 41a-c are maintained in a spaced-apart relationship from surface 22 until the user moves housing 23 relative to the surface in a predetermined direction to the surface, whereupon one of marking means 41a-c that has been selected by selector 42 extends outward beyond base 30 to mark surface 22 with an intelligent mark 45 at a desired point. The predetermined direction may be substantially perpendicular to surface 22 or at an angle relative to surface 22. Selector 42 is capable of selecting among a plurality of different types of marks to provide a unique mark specific to the type of information detected by sensor 25. Multiple marker 41 may operate through an aperture 46 in the bottom of either housing 23 or base 30. Stops 47 are placed within aperture 46 to limit the amount of compression and force that can be imparted to marking means 41. These stops 47 help provide for a uniform intelligent mark 45 independent of varying amounts of force that can be applied to housing 23 by the user. A lock out mechanism 52, such as a sliding door, may be used to protect multiple marker 41 from the environment and stop unwanted marking when marking apparatus 40 is not in use.

Hand-held measurement and marking apparatus 40 provides marking capability for information gathering device 24 that is not limited to a simple mark showing location of a sensed object. Apparatus 40 may leave marks that provide additional important information on the marking surface 22 such as the type of object discovered by sensor 25. For example, a red mark may be provided upon detection and location of live wires 48 behind enclosed walls; a green mark may be provided when detecting studs 49; and a black mark may be provided when detecting and marking metal objects 50. Such intelligent marking capabilities are especially important for safety, because wires that are detected maybe live wires. The use of color coded marking means can also be used to prepare tasks for various construction-trade workers who may appear on the job site several days after the location marking has occurred. U.S. Pat. No. 6,211,662 to Bijawat et. al. provides for a hidden object sensor with circuitry that can sense and locate live wires, studs and metal objects behind walls and is incorporated herein by reference. Bijawat et. al., however, do not provide a means for selectively marking information detected by a sensor about a hidden object onto a surface through the use of intelligent marks.

FIGS. 4a-e illustrate the components of a hidden object sensing and marking apparatus 60 that can sense multiple materials and independently mark them by different colors or other characteristic marks. In this embodiment the user is able to manually select the material to be sensed and mark its location with a unique mark that indicates the type of material sensed. Apparatus 60 comprises a housing 23. On the top of housing 23 is a plurality of light-emitting diodes (LEDs) 61 aligned along the vertical center line. These diodes 61 light up to provide a visual cue that an object has been found. Numerous sensing devices are available from various manufacturers with varying patterns of visual clues from the flashing red and/or green lights to the word "stud" when a sensed object has been detected. Audible components synchronized with the visual cues are available as well. These may include a beeping sound consisting of one short beep, several separate beeps, or a long sustained beep. These sounds communicate to the user not only that a hidden object has been detected, but also information about the physical properties of the hidden object. A manual selector 62 for selecting a desired material to be sensed is located next to the diodes 61. A linear measurer 63 aligned with marking means 41 may be located on the forward portion of the housing to assist the user with additional marking once the location of the edges of the hidden object are identified. A device to remove unwanted marks 64 may be located on the rear portion of the housing. An aperture 46 in the bottom of housing 23 provides an opening to multiple marker 41.

Multiple marker 41 has a plurality of individual marking means 41a-c supported by support 29a. Support 29a may be a multi-faceted structure with different markers attached to each facet of the support structure. Each marking means 41a-c is capable of imprinting a different color and/or pattern when marking. Marking support 29a, which may be removable, replaceable or renewable is held at least partially contained in housing 23 by retractable pins 51 that are part of connector 43a. Marking support 29a is adjustably connected to a mode-of-operation controller 26. The mode-of-operation controller 26a-c is connected to sensor 25. Controller 26a-c turns on or energizes the desired sensing mode of sensor 25. Support 29a pivots around an axis, such as the longitudinal axis, allowing the individual marking means 41a-c to be aligned vertically within the housing. On the end of connector 43a is a gear 65 with teeth 66. Teeth 66 of gear 65 interlock with ridges 67 on selector bar 68. During the sensing mode selection process, the user moves selector bar 68 left or right to activate different sensing states for the hidden object sensor, i.e., stud 73a, metal 73b or wire 73c. Correspondingly, multiple marker 41 is rotated so that the appropriate individual marking means 41a-c is in the correct position to provide the unique mark associated with the particular sensing state selected. In the OFF position, facet 69 having no marking means is aligned with base 30 so that no mark can be transposed if accidental housing activation occurs or to ensure marking does not occur while tool is in storage. In the OFF position, the other individual marking means 41a-c are kept protected and clean within housing 23.

Selector bar 68 rides in a slot 70. It has a knob 71 connected to it that when pressed by the user towards the front of housing 23, knob 71 compresses a spring 72 allowing the user to move knob 71 between the different sensing states 73a-c. Correspondingly selector bar 68 rotates gear 65, which then aligns the appropriate individual marking means 41a-c into position for marking a mark that is uniquely correlated with the type of object to be sensed. Switches 74a, 74b and 74c are activated when knob 71 is pressed against each switch by spring 72. For example if knob 71 is moved to sensing state 73a (STUD), switch 74a activates controller 26 to a mode 26a so that measuring and marking apparatus 60 can sense a wooden stud with sensor 25. With knob 71 in this position, marker 41a is aligned and positioned to mark a mark 45a on surface 22 that corresponds to a wooden stud. Similarly when knob 71 is moved to sensing state 73b (METAL) or sensing state 73c (WIRE) the controller is activated so that sensor 25 senses metal or live wire respectively. Electrical signals are passed through electrical connection means 75. In the OFF position, switch 74x is engaged, the sensor is turned off, and facet 69 that has no marker is aligned with base 30.

Housing 23 has a base 30 that is resiliently connected to the housing by a resilient connection means 31. Selected marking means 41a is maintained in a spaced-apart relationship from surface 22 until the user moves housing 23 relative to the surface in a predetermined direction to the surface, whereupon marking means 41a extends outward beyond base 30 to mark surface 22 with a selected mark 45a at a desired point. The predetermined direction may be substantially perpendicular to surface 22 or at an angle relative to surface 22.

The hidden object sensing and marking apparatus 60 illustrated in this embodiment would be utilized as follows. The user moves selector knob 71 from OFF position 73× to WIRE position 73c. In doing so, multiple marker 41 is rotated so that individual marking means 41c (color red) is aligned within aperture 46 of base 30. This movement of selector knob 71 also activates controller 26c to start sensing for hidden live wires. After the tool self calibrates, the user moves apparatus 60 across surface 22 (the wall) until diodes 61 start to light. When all diodes 61 are lit, indicating a live wire, the user presses housing 23 towards the wall. During the marking process, marking means 41c extends outward beyond base 30 to mark surface 22 with a selected (red) mark 45c marking the location of the live wire.

Figure 5:
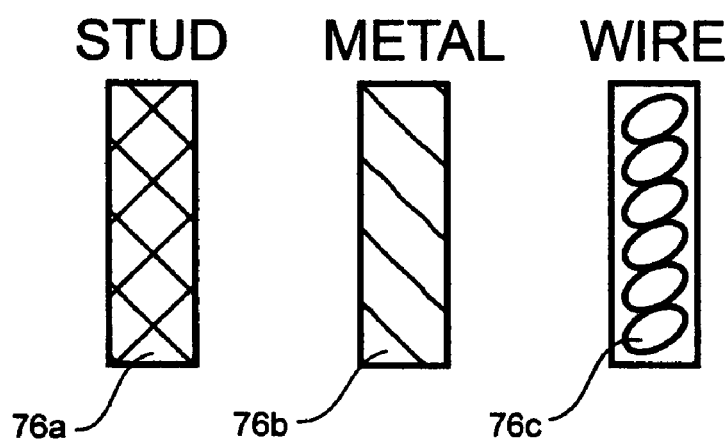
FIG. 5 is a schematic diagram depicting examples of marker patterns that can be transferred onto a surface to leave a record of intelligent information that was measured by an information gathering device.

As an alternative or adjunct to color coding, apparatus 60 may employ a coded system of symbol indicia, e.g. symbols adopted by a standards organization such as the American National Standards Institute (ANSI) (http://www.ansi.org). FIG. 5 shows several embodiments of such symbolic indicia 76a-c. These marks may be erasable. They may be made with a marking material visible under black light. They may also be made by a marker using other special codes that can be read by machinery specifically designed to read such coded information. Marking symbols may further be barcodes or other such symbols and indicia readable by a scanner.

Figures 6A, 6B:
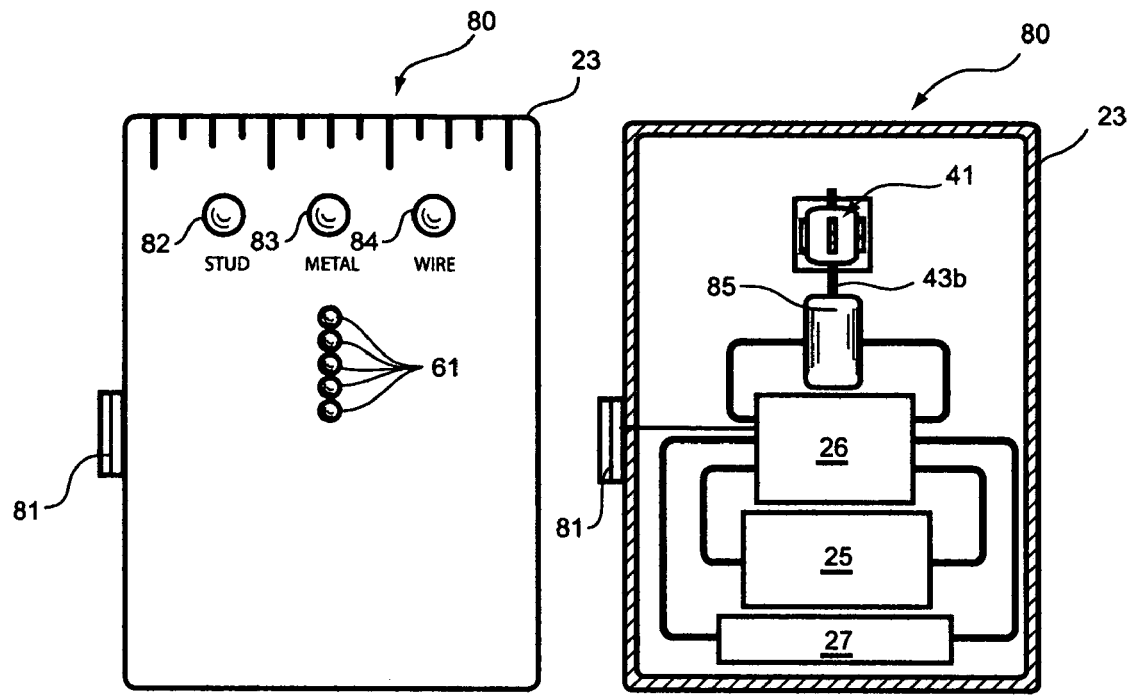
Figure 6C:
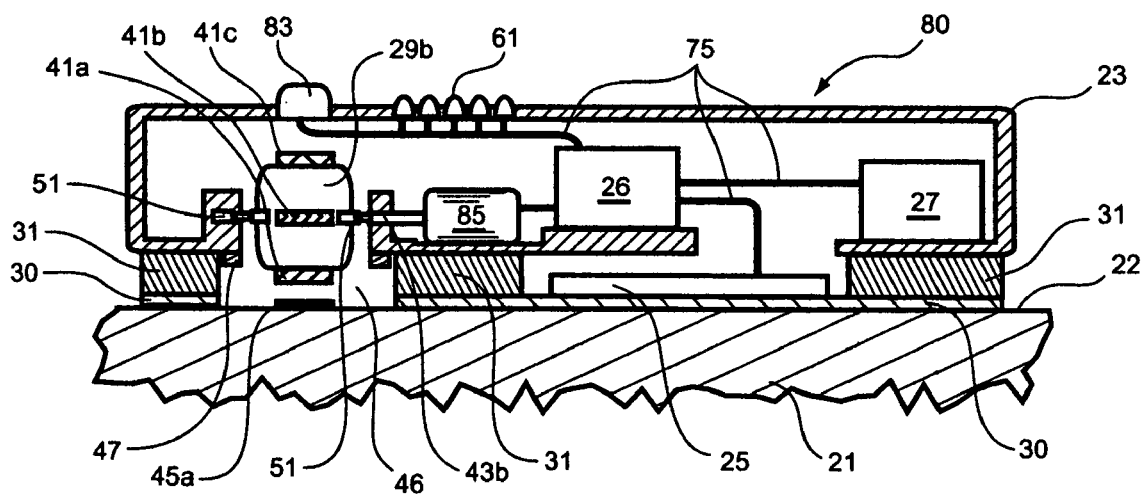

FIGS. 6a-c illustrates another embodiment of a hidden object sensing and marking device according to the present invention. In this embodiment sensor 25 automatically senses each type of material hidden within the wall and automatically selects a marking means 41a-c for marking. To place a unique mark 45a, the user need only locate the hidden object and then press down on housing 23 to mark the material type and position of that object.

Apparatus 80 comprises a housing 23. On the side of housing 23 is an ON/OFF button 81. On the top of housing 23 is a plurality of visual indicator diodes, e.g. STUD 82, METAL 83 and WIRE 84. These indicators such as light emitting diodes 82-84 indicate the type of material of the object that has been found. Below the indicator diodes 82-84 is a plurality of light-emitting diodes (LEDs) 61 aligned along the vertical center line. These locating diodes 61 light up in a particular pattern to provide a visual cue as to the exact location of the object that has been found. Audible indicators may also be added to indicate that a given material has been detected. A linear measurement device 63 may be located on the forward portion of the housing and aligned with multiple marker 41 for additional marking capability. An aperture 46 in the bottom of housing 23 provides an opening to multiple marker 41.

Multiple marker 41 has a plurality of individual marking means 41a-c supported by support 29b. Support 29b may be a multi-faceted structure with different markers attached to each facet of the structure. Each marking means 41a-c is capable of imprinting a different color and/or pattern when marking. The marking support 29b, which may be removable, replaceable and renewable, is held at least partially contained in housing 23 by retractable pins 51 that are part of connector 43b. Marking support 29b is adjustably connected to an electronically controlled selector 85. Electronically controlled selector 85 may be a rotational actuator, motor, solenoid or the like. Selector 85 is electrically connected to controller 26. Controller 26 automatically interprets information from sensor 25 and energizes the desired sensing and marking mode. Support 29b pivots around an axis, such as the longitudinal axis, allowing the individual marking means 41a-c to be aligned vertically within the housing. During the sensing and locating process, multiple marker 41 is automatically rotated so that the appropriate individual marking means 41a-c is in the correct position to provide the unique mark associated with the particular material parameter sensed.

Housing 23 has a base 30 that is resiliently connected to the housing by a resilient connection means 31. Selected marking means 41a is maintained in a spaced-apart relationship from surface 22 until the user moves housing 23 relative to the surface in a predetermined direction to the surface, whereupon marking means 41a extends outward beyond base 30 to mark surface 22 with a selected mark 45a at a desired point. The predetermined direction may be substantially perpendicular to surface 22 or at an angle relative to surface 22.

The above described hidden object sensing and marking apparatus 80 would be utilized as follows. The user would turn apparatus 80 on with ON/OFF button 81. The tool is placed upon object 21 and is allowed to self calibrate. The user moves apparatus 80 across surface 22 until one of indicator diodes 82-84 is illuminated indicating the type of material found. For example, assume the hidden object sensor locates a live wire. During this process controller 26 sends a signal to electronically controlled selector 85 telling it that a live wire has been detected by sensor 25. Electronically controlled selector 85 then rotates multiple marker 41 by connector 43*b* to a position where individual marking means 41*c* (WIRE) is positioned to exit base 30. Locating diodes 61 start identifying the exact position of the object found. When all diodes are lit indicating the exact position of the object found, the user pushes down on housing 23 towards the intended marking surface. Marking means 41*c* extends outward beyond base 30 through aperture 46 to mark surface 22 with a selected (red) mark 45*c* marking the location of the live wire.

Figure 7A:
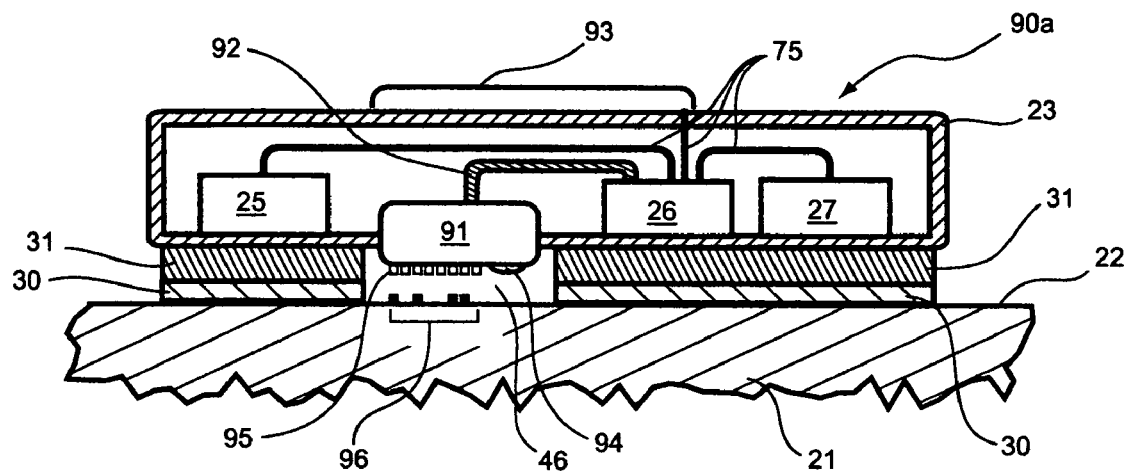
FIG. 7a is a cross-sectional, side elevation, schematic diagram of an information gathering device that incorporates a printer to mark intelligent information on a surface.
Figure 7B:
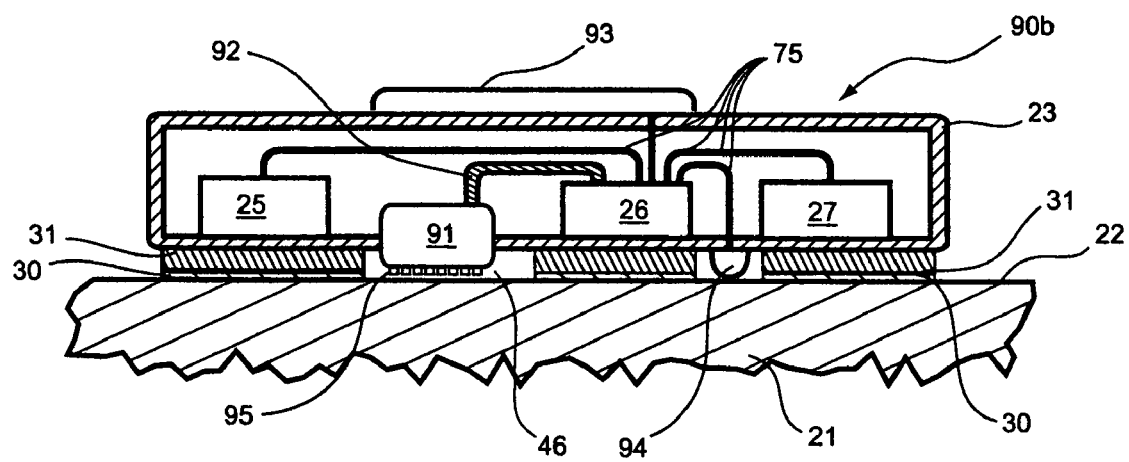
FIG. 7b is a cross-sectional side elevation, schematic diagram of an information gathering device depicting another embodiment that incorporates a printer and a switch to mark intelligent information on a surface.
Figures 7C, 8:
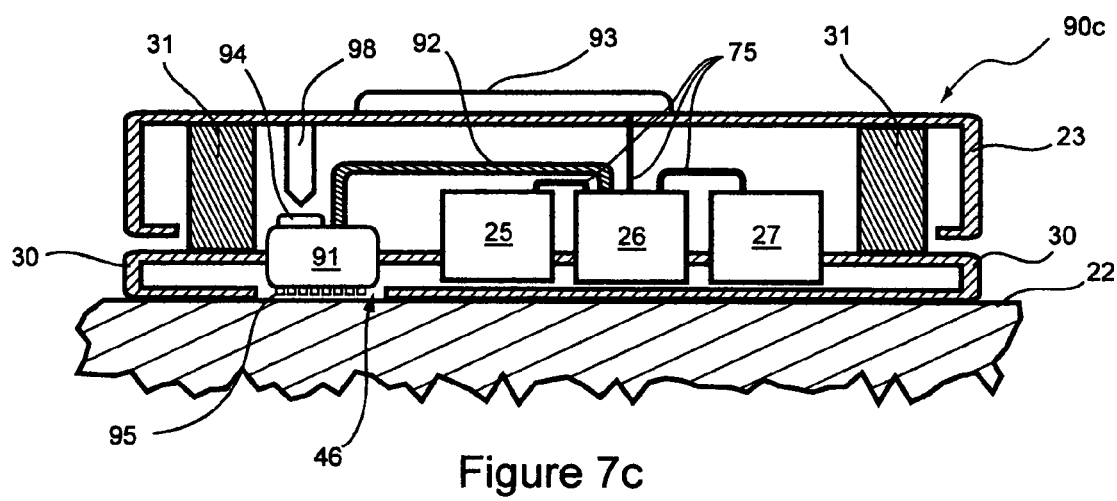
FIG. 7c is a cross-sectional side elevation, schematic diagram of an information gathering device depicting yet another embodiment that incorporates a printer and a switch to mark intelligent information on a surface.
FIG. 8 is a schematic diagram depicting examples of alpha numeric patterns that can be transferred out of the base of the housing and onto a surface to leave a record of intelligent information that was measured by the information gathering devices in FIGS. 7a-c.
Figure 9A:
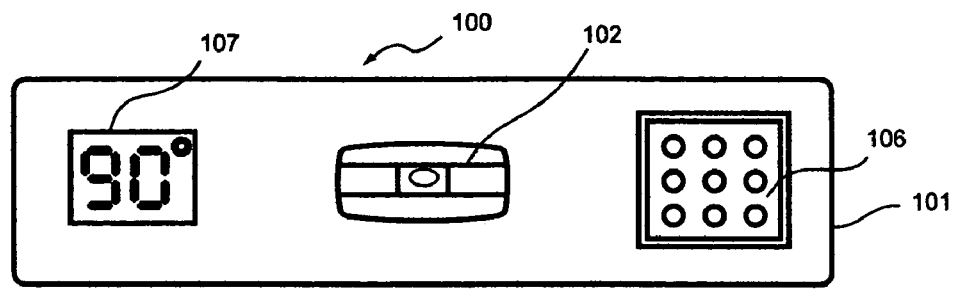
FIG. 9a is a top plan view of a level that incorporates electronic sensing, electronic programming and digital readout with housing activated marking.
Figure 9B:
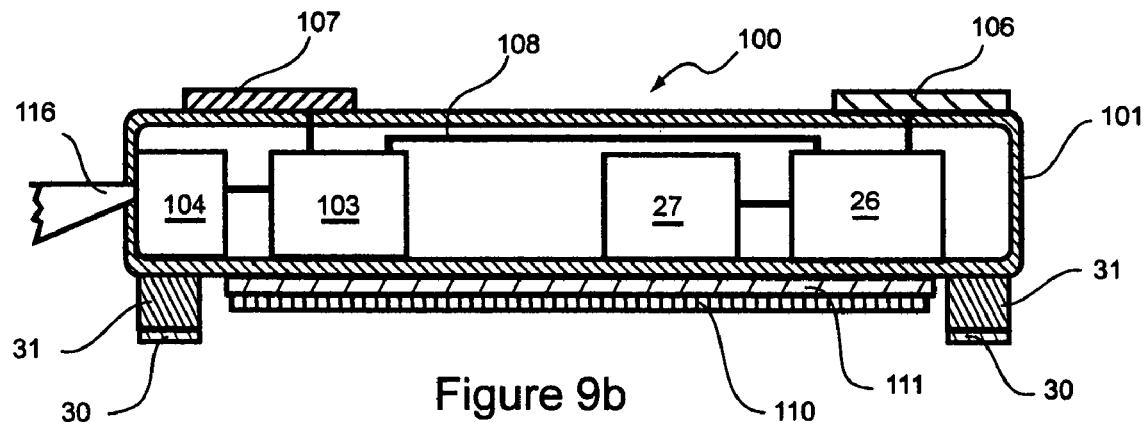
FIG. 9b is longitudinal cross-section, side elevation, schematic diagram of the level in FIG. 9a depicting how various electronic and sensing components communicate with each other and the use of resilient material to enable the housing activated marker.
Figure 9C:
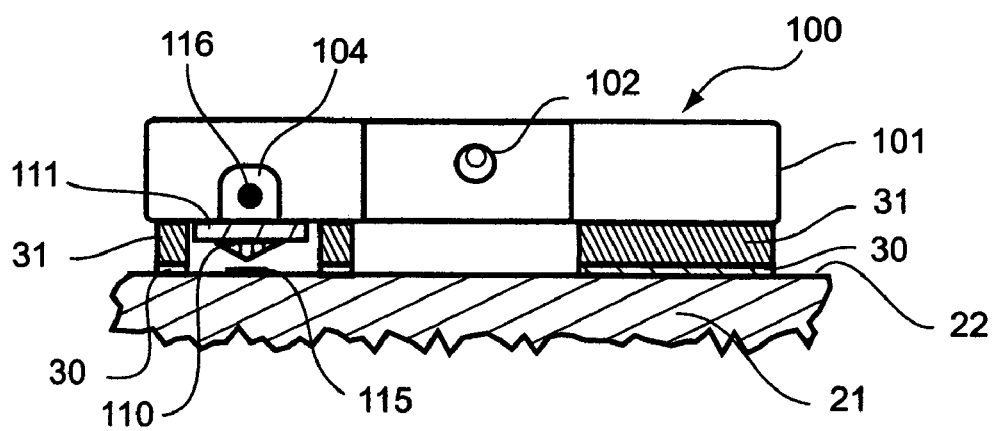
FIG. 9c is a horizontal cross-section, side elevation, schematic diagram of the level in FIG. 9a depicting the alignment of a laser and the housing activated marker.
Figure 9D:
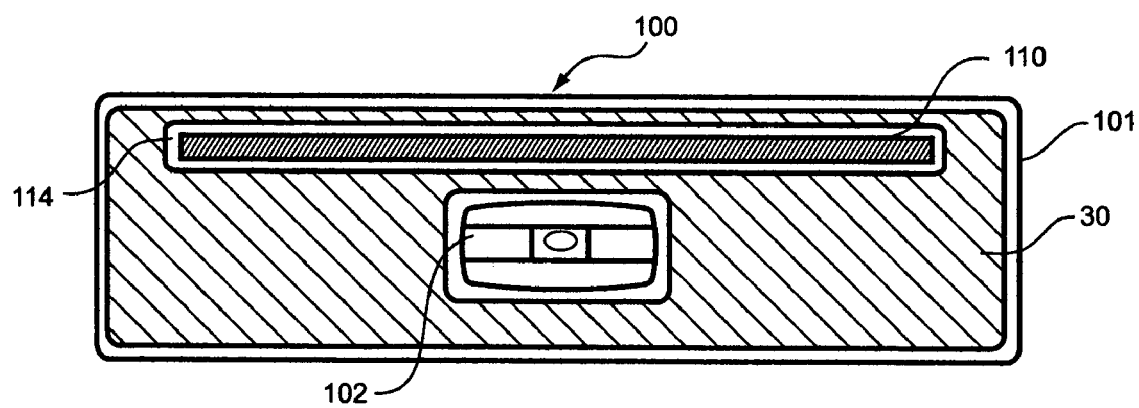
Figure 10A:
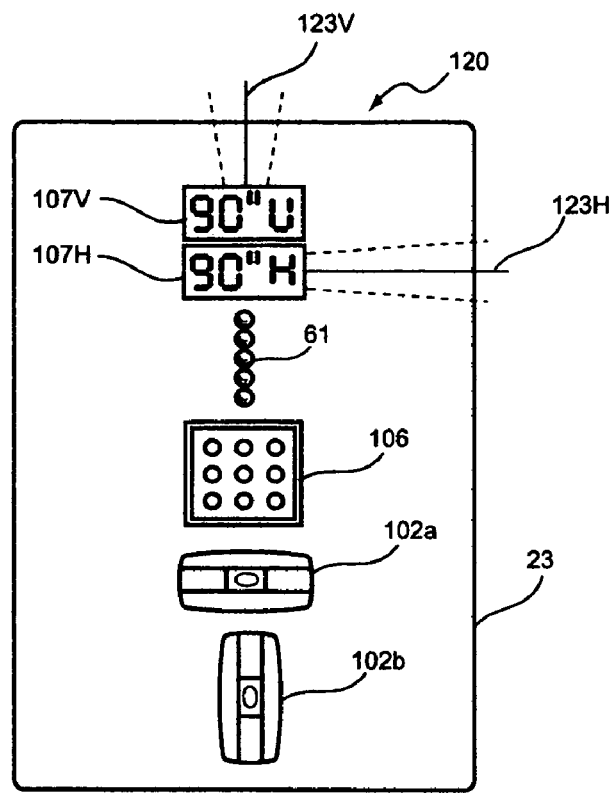
FIG. 10a is a top plan view of an information gathering and marking device incorporating multiple sensors and multiple markers.
Figure 10B:
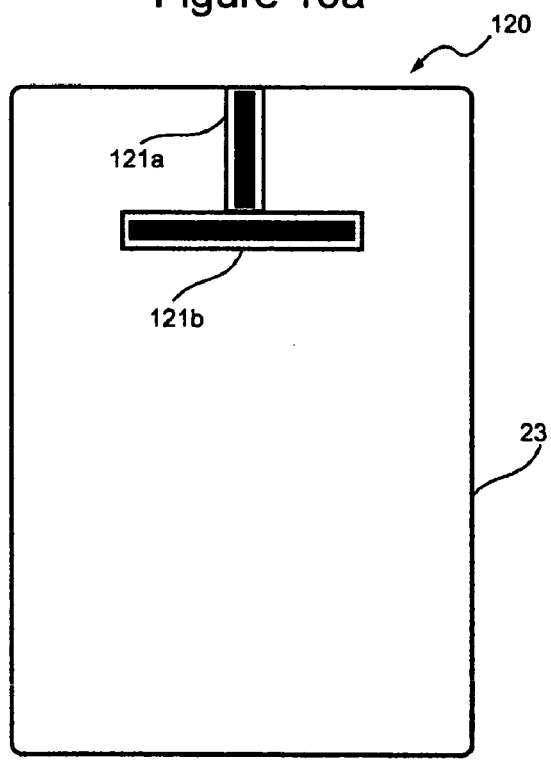
Figure 10C:
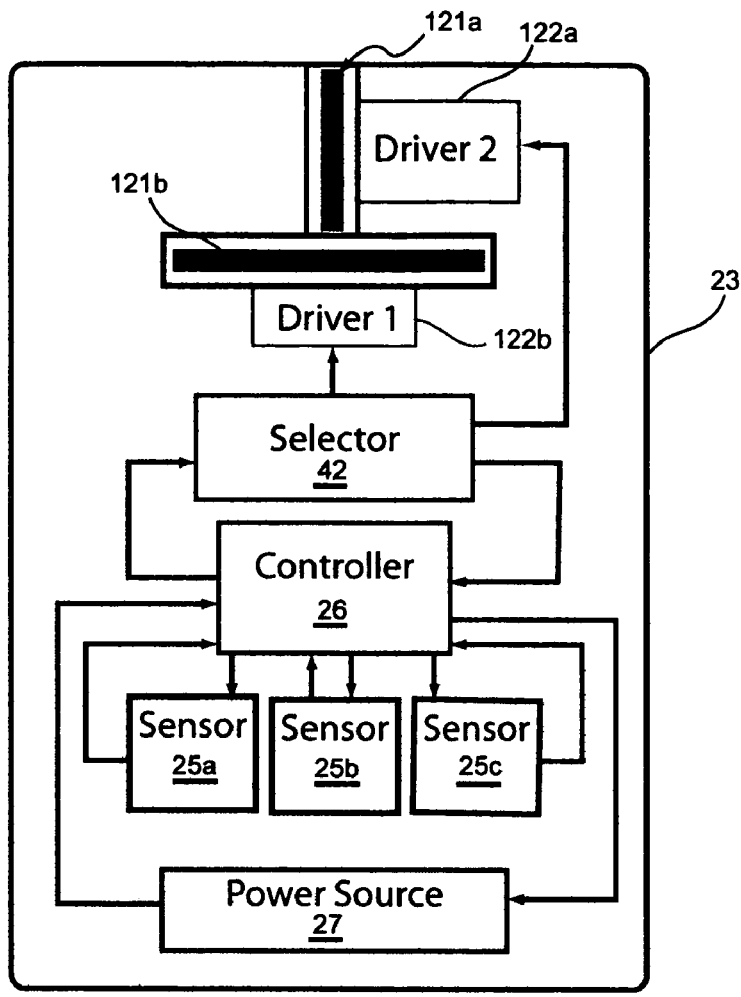
FIG. 10c is a block diagram depicting an information gathering and marking device incorporating multiple sensors and multiple drivers.
Figure 10D:
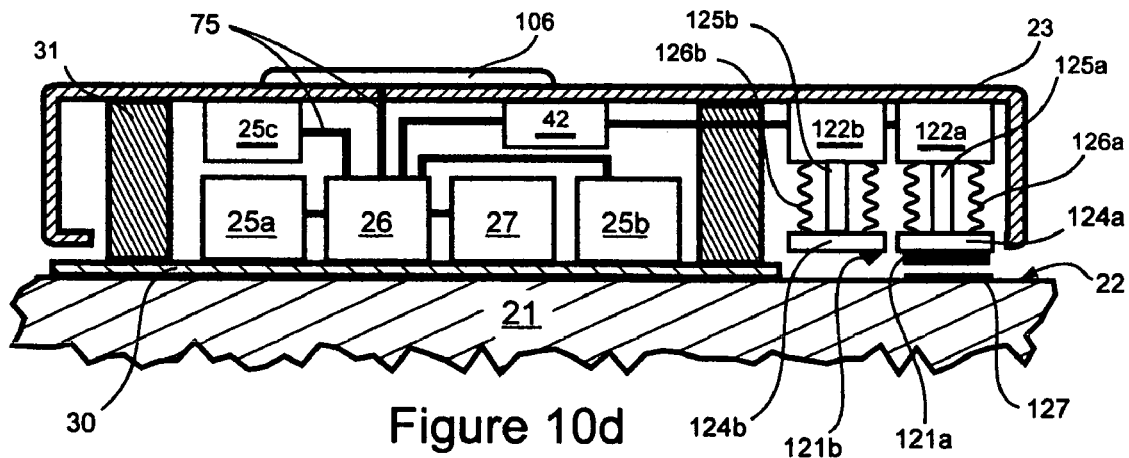
FIG. 10d is a cross-sectional, side elevation, schematic diagram of the information gathering device in FIGS. 10a-c depicting the integration of multiple sensors with a controller, a selector and multiple drivers to allow for housing activated intelligent marking.

Additional embodiments of an integrated assembly for gathering information and transferring it to a surface are illustrated in FIGS. 7*a-c*. In these embodiments the information gathering device senses information about a material or physical property near or within object 21. Information about the sensed parameter is then printed onto the object's surface 22 by a print head 91, which is activated when the user pushes on housing 23 in a direction substantially perpendicular to the intended marking surface.

There are several major print technologies available consisting of impact printing and non-impact printing. Dot matrix printing is an example of impact printing whereby the printer assembly touches the marking surface to transfer a mark. Conversely an ink jet printer assembly need not contact the marking surface to mark as it uses a series of nozzles to spray tiny drops of ink directly onto a surface. Either system can be employed in the present invention. The use of a dot-matrix or inkjet printer head allows for unlimited forms of marking indicia 96 to be transferred to a surface. U.S. Pat. No. 6,952,880 to Saksa provides for an inkjet printer head to mark on a surface and is incorporated by reference. The patent to Saksa enables inkjet printing onto a surface, however, it does not enable housing activated intelligent marking of sensed parameters.

Information gathering and marking devices 90*a-c* comprise a housing 23, a sensor 25 mounted to sense, a base 30 resiliently connected to housing 23 and a print head 91 positioned to produce a mark on the surface when housing 23 is pressed toward the surface. Devices 90*a-c* further comprise a power source 27 and a controller 26. Controller 26 communicates information through cable 92 to print head 91. Controller 26 may include a microprocessor and memory. Controller 26 may be integrated into a single component with sensor 25. Controller 26 is connected to a user interface 93. User interface 93 may include a display, such as a liquid crystal display, and a key pad so that the user can interface with controller 26. Sensor 25, power source 27 and user interface 93 are all connected through electrical connection means 75 to controller 26. Printer head 91 resides within an aperture 46 in the base of housing 30. Devices 90*a-c* is turned on through user interface 93. Once on, controller 26 automatically energizes the desired sensing mode and interprets information from sensor 25. Controller 26 converts the information obtained from sensor 25 into printable information and communicates it to printer head 91. When desired information is obtained, the user presses housing 23 toward surface 22 to mark that desired information on the surface.

Different structures may be employed for activating print head 91 when the user presses housing 23 towards surface 22. FIG. 7*a* illustrates a structure where a switch 94 is mounted on the bottom of printer head 91. FIG. 7*b* illustrates a second structure where switch 94 is mounted on the bottom of housing 23. In both of these cases, print head 91 and switch 94 are maintained in a spaced-apart relationship from surface 22 until the user moves housing 23 relative to the surface in a predetermined direction towards the surface. When switch 94 senses the presence of surface 22, either optically, electrically, mechanically or by pressure, the switch activates print head 91 and marking material is dispensed from nozzles 95 in a predetermined pattern to mark the surface at a desired point with an intelligent mark 96 containing information about the parameter sensed. FIG. 7*c* illustrates a third structure where print head 91 is mounted to base 30 and switch 94 is located on the top of print head 91. Here an actuating stud 98 connected to housing 23 is held in a spaced-apart relationship from switch 94 until the user moves housing 23 relative to surface 22 in a predetermined direction towards the surface. When switch 94 senses the presence of stud 98, the switch activates print head 91 and marking material is dispensed from nozzles 95 to mark the surface.

FIG. 8 illustrates examples of indicia 96 that can be transferred to surface 22. Indicia 96*a* illustrates a mark indicating the presence of a STUD sensed by an information gathering and printing device according to the present embodiment. The indicia mark is made up of a plurality of smaller marks. Each smaller mark is the result of information being interpreted from the sensor and selected to appropriately activate the marker to create the indicia. Indicia 96*b* illustrates a pattern indicating the presence of METAL sensed. This indicia mark consists of a finer plurality of smaller marks as might be produced by a dot matrix printer. Indicia 96*c* illustrates a mark indicating the presence of a WIRE sensed. This indicia mark is yet more refined and illustrates an intelligent mark from a sensor that may be generated by an inkjet printer or laser printer.

Another tool to which the present housing activated marking system may be applied is the carpenter's level. The present invention eliminates the awkwardness of holding a level to the intended surface with one hand and then having to mark with the other. It provides for straight lines or other patterns to be marked along the length of the level by simply pressing the housing of the level towards the surface to be marked. In this embodiment the marking implement is the level housing rather than a separate entity such as a pencil.

A marking level embodiment is illustrated in FIGS. 9*a-d*. Marking level 100 comprises a level housing 101 and one or more level sensors. The level sensors may include a spirit level 102, a digital level sensor 103 and a laser 104. Housing 101 may further comprise a key pad user interface 106 and a digital display device 107. The electronic components are linked together through electrical connections 108. Power source 27 is activated through key pad user interface 106. Key pad user interface 106 communicates information through a controller 26 to digital level sensor 103. Controller 26 may include a microprocessor and memory. Digital level sensor 103 can output the angle of marking level 100 to digital display device 107. The user can visually observe the angle that level 100 is being held at and press on housing 101 to mark a line at that angle. Key pad user interface 106 communicates information through controller 26 to digital level sensor 103. The user may input or record specific angular measurements. Laser 104 can output a beam of light 116 that can project a line of light on the wall and provide further angular or levelness indicating capabilities.

Marker 110 for marking surface 22 is supported by support 111 which is connected to housing 101. Marker 110 is replaceable as support connection includes but are not limited to rails, glides, adhesive, magnets and the like. Marker 110 is aligned with spirit level 102, digital level sensor 103 and laser 104 by way of housing 101. Housing 101 has a base 30 that is resiliently connected to the housing by resilient connection means 31. To operate this embodiment, the user positions level base 112 against intended marking surface 22. The user maneuvers level 100 so the output from the spirit level 102 or digital level sensor 103 is oriented to a desired angular orientation. The user then pushes on level housing 101 towards the intended marking surface 22 to leave a mark 115. Marking means 110 is maintained in a spaced-apart relationship from surface 22 until the user moves housing 101 relative to the surface in a predetermined direction to the surface, where upon marking means 110 extends outward beyond base 30 to mark surface 22 at a desired angle. Marking means 110 operates out of aperture 114 in base 30.

FIGS. 10a-d illustrate still another embodiment of the current invention. Information gathering and marking device 120 incorporates multiple sensors 25a-c and multiple markers 121a-b. In essence several information gathering and marking devices are combined and aligned within a single housing 23 and produce at least one marking result 127 when the user presses housing 23 towards the surface 22 to be marked. The devices may be used in combination with each other or separately. The mark 127 may possess information from one or all of the sensors. An example would be a level line, located at the position of a hidden stud with the distance from the ceiling recorded. Such a mark would record information from a level sensor, hidden object sensor and range sensor all at the same time.

For illustrating this embodiment, device 120 includes a hidden object sensor 25a, a level sensor 25b and a range sensor 25c. All sensors 25 are connected to controller 26 through electrical connection means 75. Controller 26 is powered by a power source 27. Controller 26 can independently activate each sensor 25. Information about parameters sensed by each sensor 25 is received and interpreted by controller 26. Controller 26 communicates this information as printable information to markers 121a-b through selector 42. Selector 42 selects driver 122a or 122b so as to appropriately position each marker 121a or 121b in a spaced apart relationship from surface 22. Each marker 121 is supported by a support 124 that is attached that is adjustably connected by a resilient support 126 to driver 122. Drivers 122 may include a driver extension 125, where when selected, drive extension 125 positions marker 121 at the correct spacing from surface 22 to either mark or not mark. Drivers 125 may include but are not limited to cams, linear actuators, rotational actuators, servomotors, solenoids or the like. Housing 23 has a base 30 that is resiliently connected to the housing by resilient connection means 31. When the user presses housing 23 towards surface 22, the appropriately positioned marker 121a and/or 121b extends outward beyond the base 30 to mark the surface with information from each sensor 25 that has been activated. Housing 23 also has opening 123V and 123H through which range finder sensor 25c may operate. Device 120 may also comprise locating diodes 61, a key pad user interface 106, and digital display devices 107H and 107V to aid the user.

In yet another embodiment of the present invention, FIGS. 11a-e show a housing activated marking system as an attachment to the information gathering device. The combined information and marking device 130 comprises a first housing 23a and a second housing 23b. First housing 23a includes at least one sensor 25 mounted to sense, and second housing 23b includes a marker 135 supported by a support 134 and a resiliently connected base 30. First housing 23a is connected to second housing 23b by connector 131. Connector 131 may be at least one from the group including adhesive, glue, adhesive tape, hook and loop fastners, magnets, screws, pins, detents, rails and grooves. Connector 131 may provide a mechanical connection that is rigid or resilient. Connector 131 may also provide an electrical connection. Second housing 23b may be removeable and replaceable when connected to first housing 23a. A mark is produced when the user presses second housing 23b towards the surface and marker 135 extends beyond base 30 to mark. Sensor 25 provides information about the parameter sensed to marker 135 through either a wired or wireless connection.

Figure 11A:
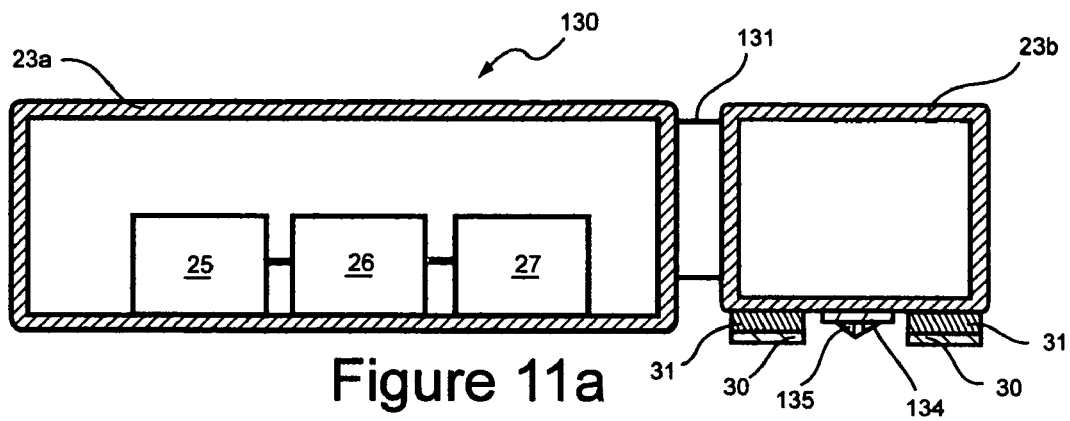
FIG. 11a is a cross-sectional, side elevation, schematic diagram showing the housing activated marking system as an attachment to an information gathering device including the sensor.
Figure 11B:
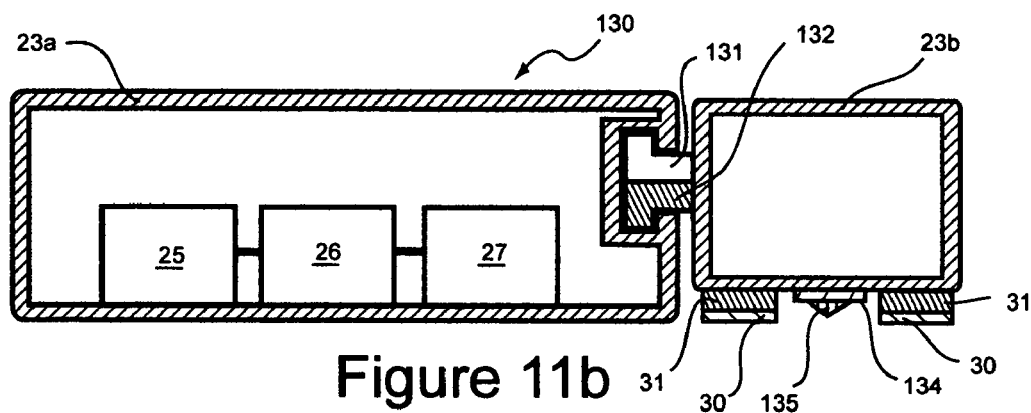
FIG. 11b is a cross-sectional, side elevation, schematic diagram showing the housing activated marking system as an attachment that is resiliently attached.
Figure 11C:
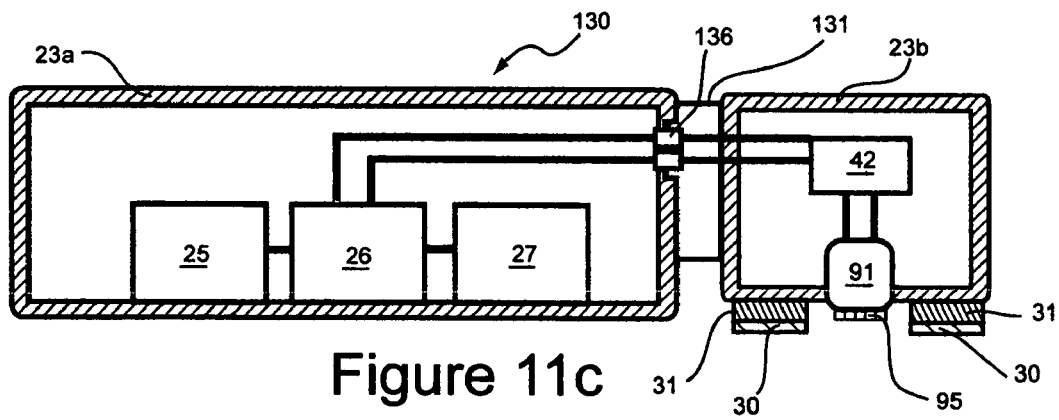
FIG. 11c is a cross-sectional, side elevation, schematic diagram showing the housing activated marking system as an attachment that communicates with the information gathering device through an electrical connection.
Figure 11D:
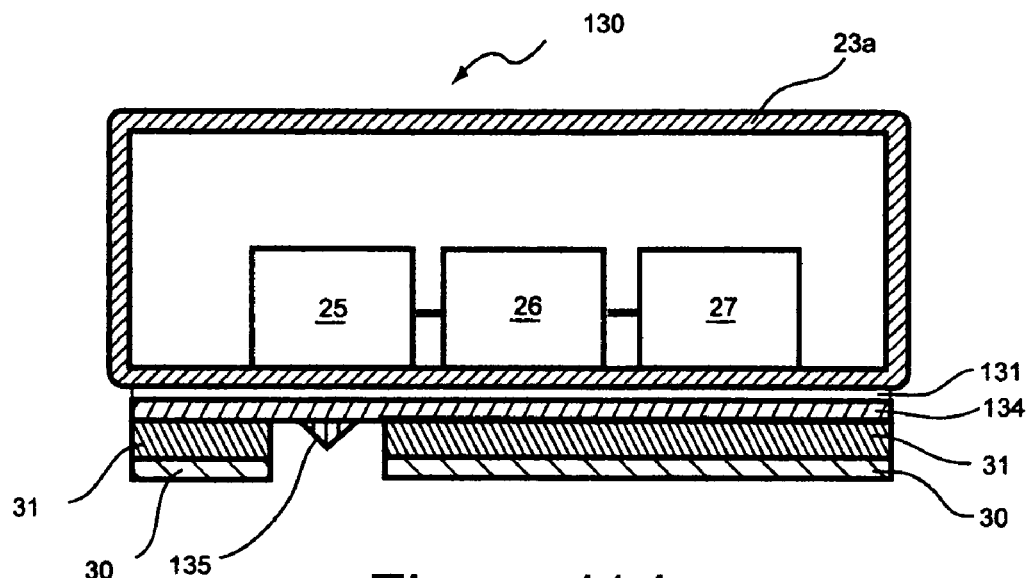
FIG. 11d is a cross-sectional, side elevation, schematic diagram showing the housing activated marking system as an attachment to the base of the information gathering system.

Variations of this embodiment are as follows. FIG. 11a illustrates how base 30 and marker 135 extend slightly lower than the surface of the bottom of first housing 23a. With connector 131 forming a rigid connection between first housing 23a and second housing 23b, the user can move both housings together over the surface. Pressing on either housing or together as one will cause marker 135 to mark the surface. With a rigid connection, first housing 23a and second housing 23b act as a single housing. The bottom of first housing 23a also acts as a stop preventing excessive compression of marker 135. In FIG. 11b, connector 131 acts as a resilient connector. Resilient material 132 allows for base 30 of second housing 23b to be flush with the bottom of first housing 23a. The user can then press second housing 23b towards the surface, compressing resilient material 132 and allowing marker 135 to extend beyond base 30 to mark the surface. In FIG. 11c, connector 131 has an additional electrical connection 136 that provides an electrical interface between sensor 25 and printer 91. An additional selector 42 is added to select information to be printed by nozzles 95. In FIG. 11d, marker 135 is supported by a support 134. Support 134 is directly connected to the bottom of first housing 23a by connector 131. Connection 131 created by connector 131 may be removable and replaceable. In FIG. 1e, the second housing is an attachment 140 for marking intelligent patterns onto the surface to aid the user in repetitive marking tasks.

Figure 11E:
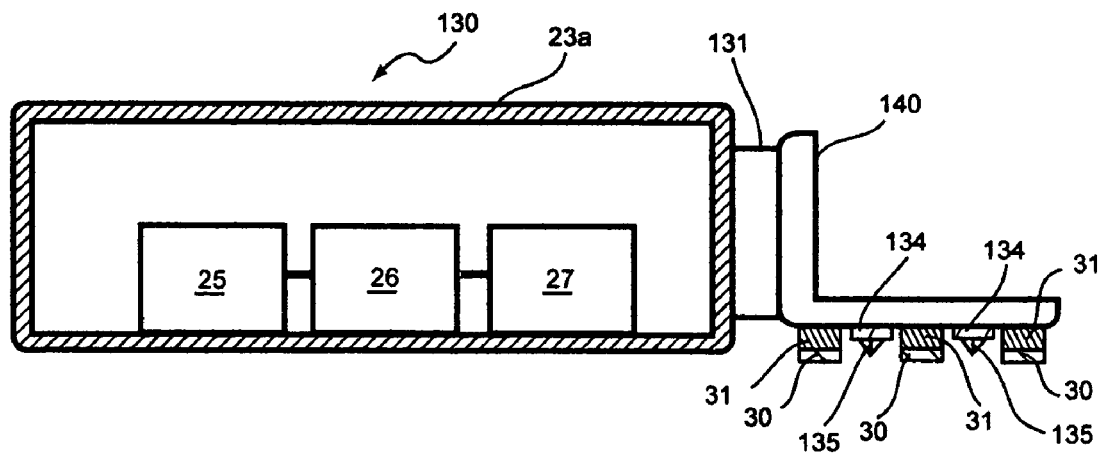
FIG. 11e is a cross-sectional, side elevation, schematic diagram showing the attached housing activated marking system comprising a plurality of markers in a pre-arranged pattern to mark intelligent patterns on a surface.
Figure 12A:
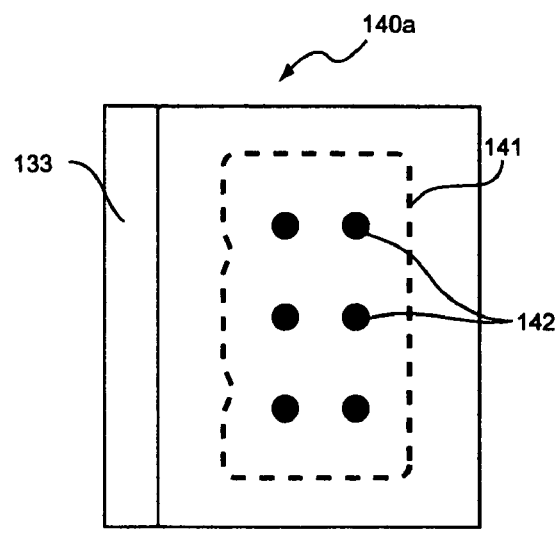
FIG. 12a is a bottom plan view of an attachment as depicted in FIG. 11e, wherein the plurality of markers is arranged for marking a drapery end bracket.
Figure 12B:
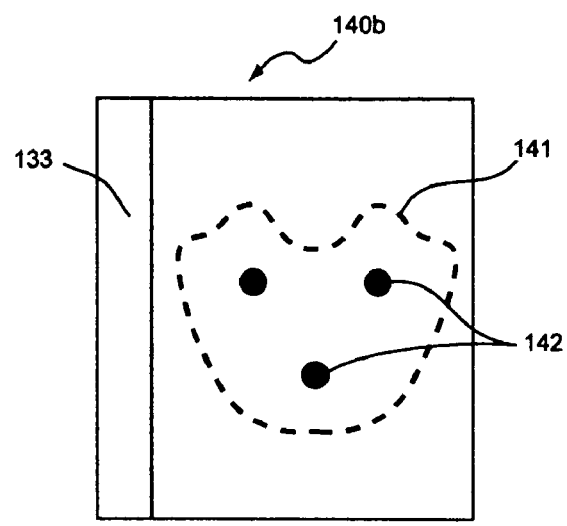
FIG. 12b is a bottom plan view of an attachment as depicted in FIG. 11e, wherein the plurality of markers is arranged for marking a drapery center support.
Figure 12C:
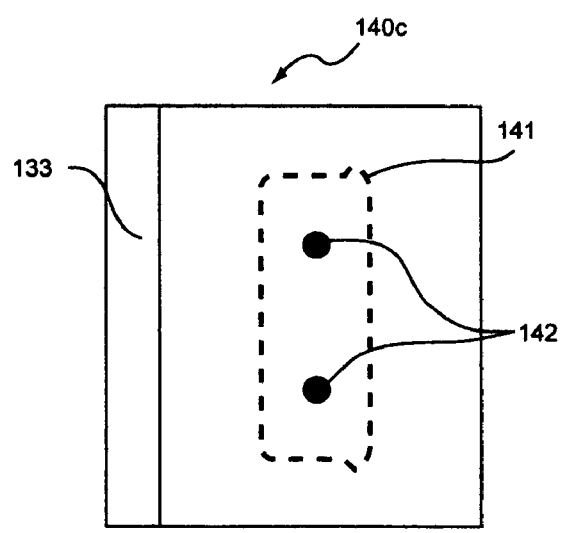
FIG. 12c is a bottom plan view of an attachment as depicted in FIG. 11e, wherein the plurality of markers is arranged for marking an angle bracket.
Figure 12D:
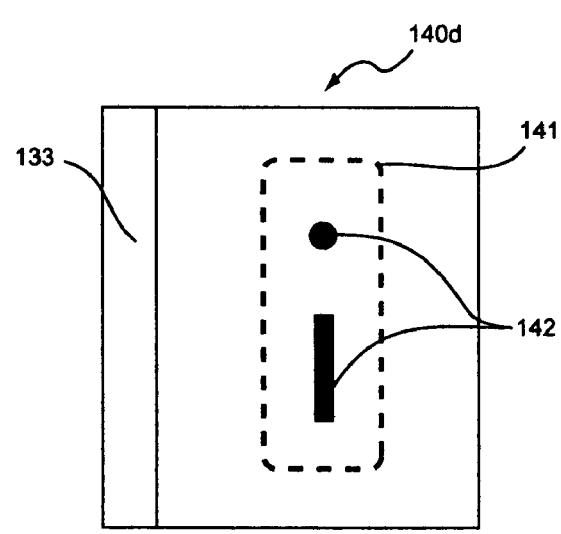
FIG. 12d is a bottom plan view of an attachment as depicted in FIG. 11e, wherein the plurality of markers is arranged for marking another type of angle bracket.

FIGS. 12a-b illustrate various attachments 140a-d that can be integrated with first housing 23a as depicted in FIG. 11e. 140a is an attachment for a drapery endbracket. 140b is an attachment for a drapery center support. 140c is an attachment for angle bracket template. 140d is an attachment for an alternative angle bracket template. Dashed line 141 represents the template outline associated with each type of pattern to be marked. Markers 140 are positioned to provide for an intelligent marking pattern to aid the user.

The invention is not limited to the embodiments represented and described above but includes all variants notably those concerning the shape of the housing of the apparatus, the nature of the materials used, the technology of the various sensors, and the means of measurement and marking. Nothing in the above specification is intended to limit the invention more narrowly than the appended claims. The examples given are intended only to be illustrative rather than exclusive.

What is claimed is:

1. A device for marking a surface, comprising:
   a) a housing;
   b) a base resiliently connected to said housing;
   c) a sensor mounted to sense a parameter; and
   d) a marker positioned so a unique mark specific to information detected by said sensor is produced on the surface when said housing is pressed toward the surface.

2. A device as recited in claim 1, wherein said marker is mounted spaced from the surface until the user moves said housing toward the surface.

3. A device as recited in claim 2, wherein said marker is mounted spaced from the surface until the user moves said housing in a substantially perpendicular direction to the surface.

4. A device as recited in claim 2, wherein when said housing moves toward the surface said marker extends to mark the surface.

5. A device as recited in claim 2, wherein when said housing moves toward the surface a marking material from said marker is dispensed to mark the surface.

6. A device as recited in claim 2, wherein said base is in contact with the surface and wherein said marker moves relative to said base when said housing is pressed toward the surface.

7. A device as recited in claim 1, wherein said marker is connected to said housing.

8. A device as recited in claim 1, wherein said marker is connected to said base.

9. A device as recited in claim 1, wherein said housing further comprises a power supply.

10. A device as recited in claim 1, wherein said housing further comprises a controller.

11. A device as recited in claim 1, wherein said housing further comprises a user interface.

12. A device as recited in claim 1, further comprising at least one driver to position said marker so said unique mark is produced on the surface when said housing is pressed toward the surface.

13. A device as recited in claim 1, wherein said sensor is at least one component of an information gathering device.

14. A device as recited in claim 1, wherein said sensor senses a parameter of at least one from the group including inside an object, outside an object, on the surface of an object and behind an object.

15. A device as recited in claim 14, wherein said sensor is at least one from the group including a hidden-object sensor, a level sensor, a range sensor, a laser sensor, and ultrasonic sensor and a sensor for detecting a selected substance.

16. A device as recited in claim 14, wherein said sensor is stationary relative to said housing.

17. A device as recited in claim 1, wherein said sensor is aligned with said marker.

18. A device as recited in claim 1, wherein when said marker is capable of marking a plurality of different types of marks.

19. A device as recited in claim 18, further comprising a selector, wherein when said selector is capable of selecting among said plurality of different types of marks.

20. A device as recited in claim 19, wherein when each said type of mark provides different information derived from said sensor and said selector is capable of selecting among said plurality of different types of marks to provide a said unique mark specific to said information detected.

21. A device as recited in claim 19, wherein said selector is a manually actuated selector.

22. A device as recited in claim 19, wherein said selector is an electronically actuated selector.

23. A device as recited in claim 19, wherein when said marker includes a plurality of markers, wherein said selector allows for selecting among said plurality of markers.

24. A device as recited in claim 19, wherein when said marker includes a print head.

25. A device as recited in claim 24, further comprising a controller for controlling output of said print head.

26. A device as recited in claim 10, further comprising a user interface for interacting with said controller.

27. A device as recited in claim 1, wherein said marker is supported by a support connected to said base.

28. A device as recited in claim 1, wherein said marker is supported by a support connected to said housing.

29. A device as recited in claim 28, wherein said support is rigidly connected to said housing.

30. A device as recited in claim 28, wherein said support is resiliently connected to said housing.

31. A device as recited in claim 1, wherein said marker is removable.

32. A device as recited in claim 31, wherein said marker is replaceable.

33. A device as recited in claim 1, wherein said marker is renewable.

34. A device as recited in claim 1, wherein said marker is aligned with said housing.

35. A device as recited in claim 1, further comprising a lock-out device to prevent unwanted marking.

36. A device as recited in claim 1, wherein said marker comprises a quantity of marking material at least one from the group including ink, pencil lead, graphite, chalk, dye, light-sensitive material, soapstone, crayon, wax, pigment and paint.

37. A device as recited in claim 1, wherein said base, sensor and marker are integrated with said housing.

38. A device as recited in claim 37, comprising a first housing and a second housing, said first housing including said sensor, and said second housing including said marker and said resiliently connected base, wherein said first housing is connected to said second housing.

39. A device as recited in claim 38, wherein when said second housing moves towards the surface said marker extends to mark the surface.

40. A device as recited in claim 38, wherein when said second housing moves towards the surface a quantity of marking material is dispensed from said marker to mark the surface.

41. A device as recited in claim 38, wherein said sensor provides information about the parameter sensed to said marker through at least one from the group including a wired connection and a wireless connection.

42. A device as recited in claim 38, wherein said first housing is mechanically connected to said second housing.

43. A device as recited in claim 38, wherein said first housing is rigidly connected to said second housing.

44. A device as recited in claim 38, wherein said first housing is resiliently connected to said second housing.

45. A device as recited in claim 38, wherein said first housing is connected to said second housing by a connector.

46. A device as recited in claim 45, wherein said connector is at least one from the group including adhesive, glue, adhesive tape, hook and loop fasteners, magnets, screws, pins, detents, rails and groves.

47. A device as recited in claim 38, wherein said first housing is aligned with said second housing.

48. A method of marking a surface, comprising:
a) placing a housing including a marker and a sensor, and a base resiliently connected to said housing on the surface;
b) using said sensor to sense a parameter; and
c) marking said surface with a unique mark specific to information detected by said sensor by pressing said housing toward the surface.

49. A method of marking a surface recited in claim 48, wherein said marker is maintained in a spaced apart relationship from the surface.

50. A method of marking a surface recited in claim 49, wherein pressing said housing toward the surface causes said marker to extend outward beyond said base to mark the surface.

51. A method of marking a surface recited in claim 49, wherein pressing said housing toward the surface causes marking material to be dispensed from said marker onto the surface.

52. A method of marking a surface recited in claim 48, wherein said information detected is at least one from the group including position, angular orientation, type of material, optical property, electrical property, physical property, magnetic property, mechanical property and chemical property.

53. A method of marking a surface recited in claim 48, wherein said sensor is a plurality of sensors each capable of sensing a different parameter.

54. A method of marking a surface recited in claim 53, wherein said information is based on one or more of said different parameters.

* * * * *